(12) United States Patent
Laftchiev et al.

(10) Patent No.: US 11,442,429 B2
(45) Date of Patent: Sep. 13, 2022

(54) SYSTEMS AND METHODS FOR ADVANCE ANOMALY DETECTION IN A DISCRETE MANUFACTURING PROCESS WITH A TASK PERFORMED BY A HUMAN-ROBOT TEAM

(71) Applicant: Mitsubishi Electric Research Laboratories, Inc., Cambridge, MA (US)

(72) Inventors: Emil Laftchiev, Cambridge, MA (US); Diego Romeres, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 200 days.

(21) Appl. No.: 16/705,621

(22) Filed: Dec. 6, 2019

(65) Prior Publication Data
US 2021/0173377 A1    Jun. 10, 2021

(51) Int. Cl.
  *G05B 19/406* (2006.01)
  *G05B 19/4063* (2006.01)
  (Continued)

(52) U.S. Cl.
  CPC ......... *G05B 19/4063* (2013.01); *B25J 19/06* (2013.01); *G05B 13/0265* (2013.01);
  (Continued)

(58) Field of Classification Search
  CPC ............ G05B 19/4063; G05B 13/0265; G05B 13/048; G05B 2219/40202
  (Continued)

(56) References Cited

U.S. PATENT DOCUMENTS

2015/0277416 A1* 10/2015 Nikovski ........... G05B 23/0232
                                                            700/110
2016/0260027 A1*  9/2016 Kuwabara ............ G06N 7/005
                              (Continued)

FOREIGN PATENT DOCUMENTS

JP        2011227773        11/2011

OTHER PUBLICATIONS

Roncone et al., "Transparent Role Assignment and Task Allocation in Human Robot Collaboration", Jun. 2017, IEEE, p. 1014-1021. (Year: 2017).*

*Primary Examiner* — Hien D Khuu
(74) *Attorney, Agent, or Firm* — Gennadiy Vinokur; Hironori Tsukamoto

(57) ABSTRACT

A system for detection of an anomaly in a discrete manufacturing process (DMP) with human-robot teams executing a task. Receive signals including robot, worker and DMP signals. Predict a sequence of events (SOEs) from DMP signals. Determine whether the predicted SOEs in the DMP signals is inconsistent with a behavior of operation of the DMP described in a DMP model, and if the predicted SOEs from DMP signals is inconsistent with the behavior, then an alarm is to be signaled. Input worker data into a Human Performance (HP) model, to obtain a state of the worker based on previously learned boundaries of human state. The state of the HW is then input into the HRI model and the DMP model to determine a classification of anomaly or no anomaly. Update a Human-Robot Interaction (HRI) model to obtain a control action of a robot or a type of an anomaly alarm.

21 Claims, 17 Drawing Sheets

(51) Int. Cl.
*B25J 19/06* (2006.01)
*G05B 13/02* (2006.01)
*G05B 13/04* (2006.01)

(52) U.S. Cl.
CPC .. *G05B 13/048* (2013.01); *G05B 2219/31481* (2013.01); *G05B 2219/40202* (2013.01)

(58) Field of Classification Search
USPC .......................................................... 700/110
See application file for complete search history.

(56) References Cited

U.S. PATENT DOCUMENTS

| | | | |
|---|---|---|---|
| 2018/0346256 A1 | 12/2018 | Kueihara et al. | |
| 2019/0217472 A1* | 7/2019 | Nakasu | B23P 19/04 |
| 2021/0034959 A1* | 2/2021 | Wood | G06F 3/017 |

* cited by examiner

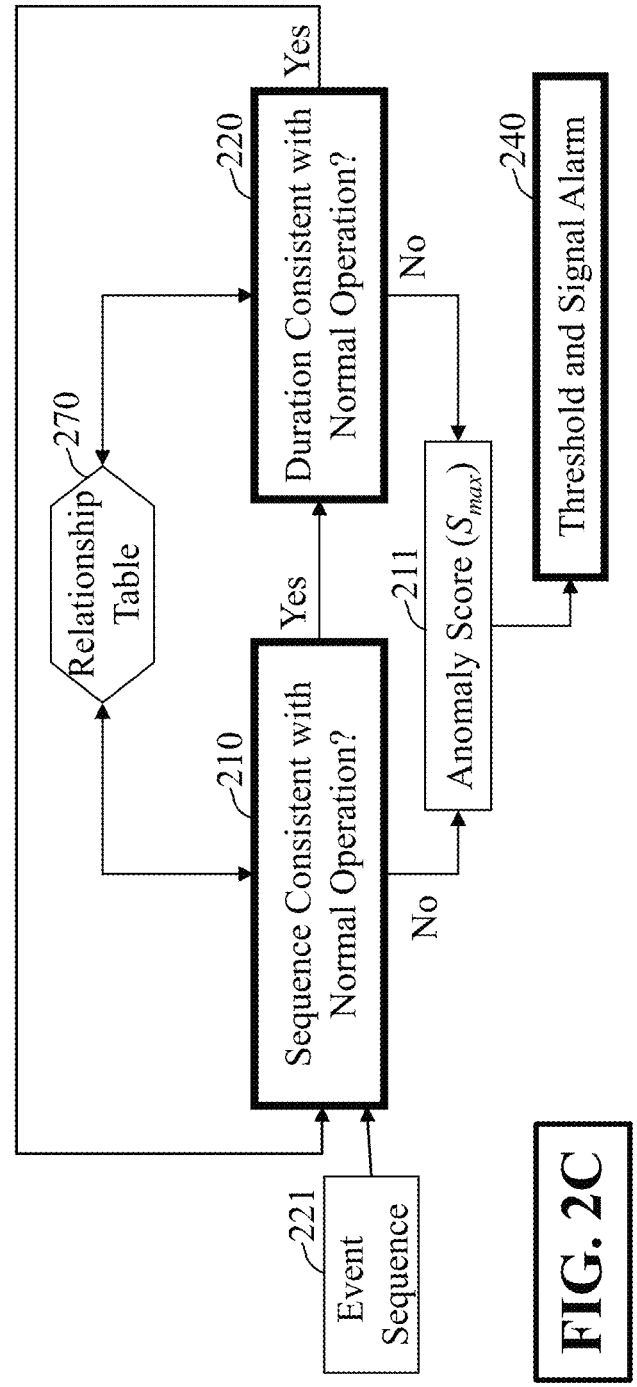

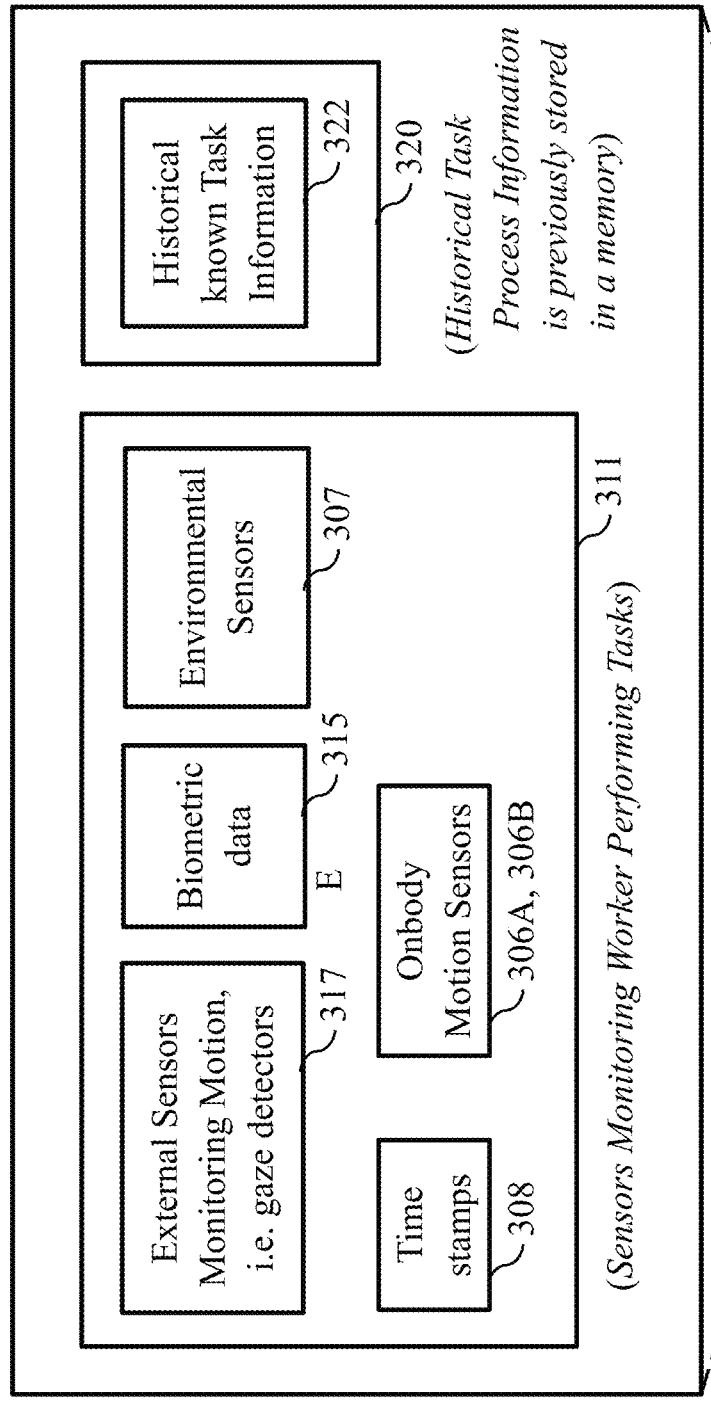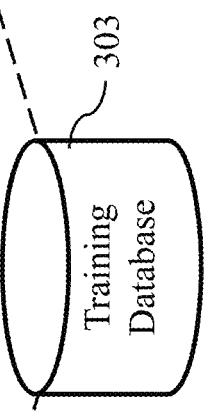
FIG. 3B

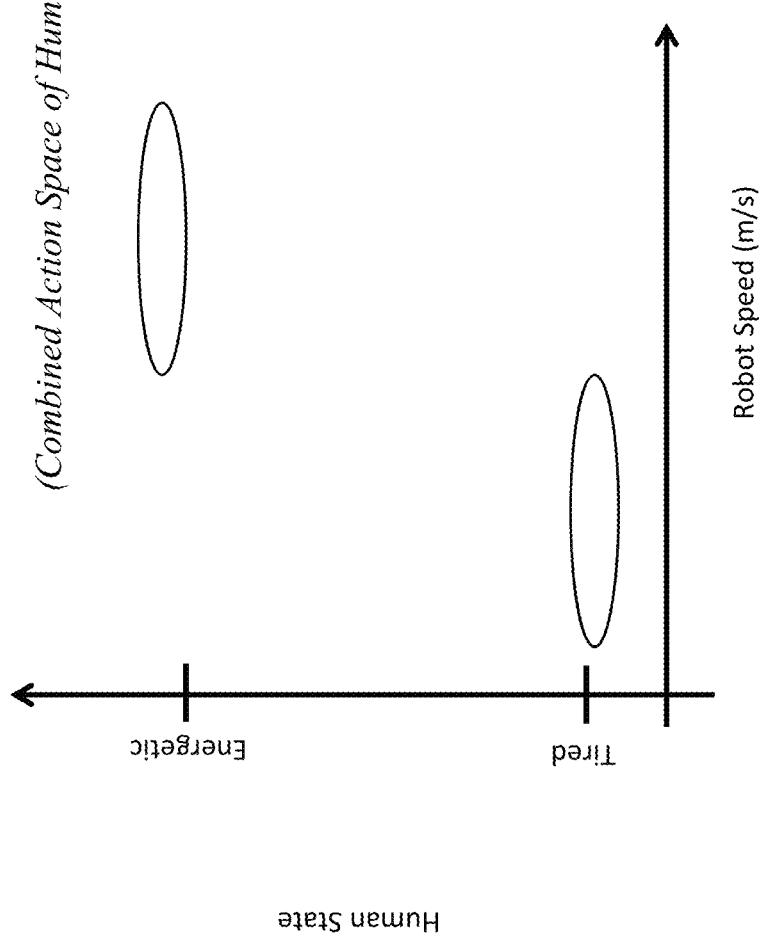

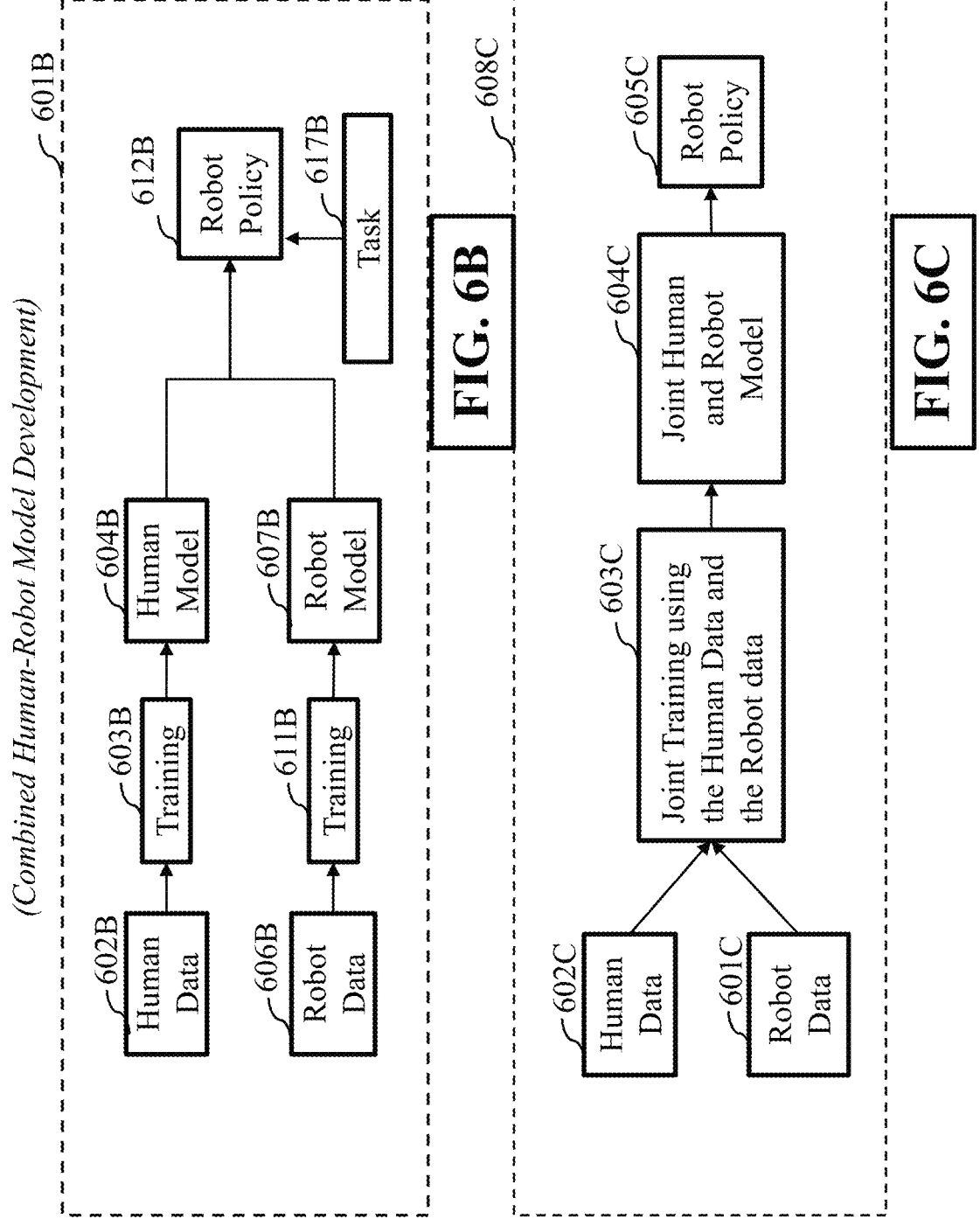

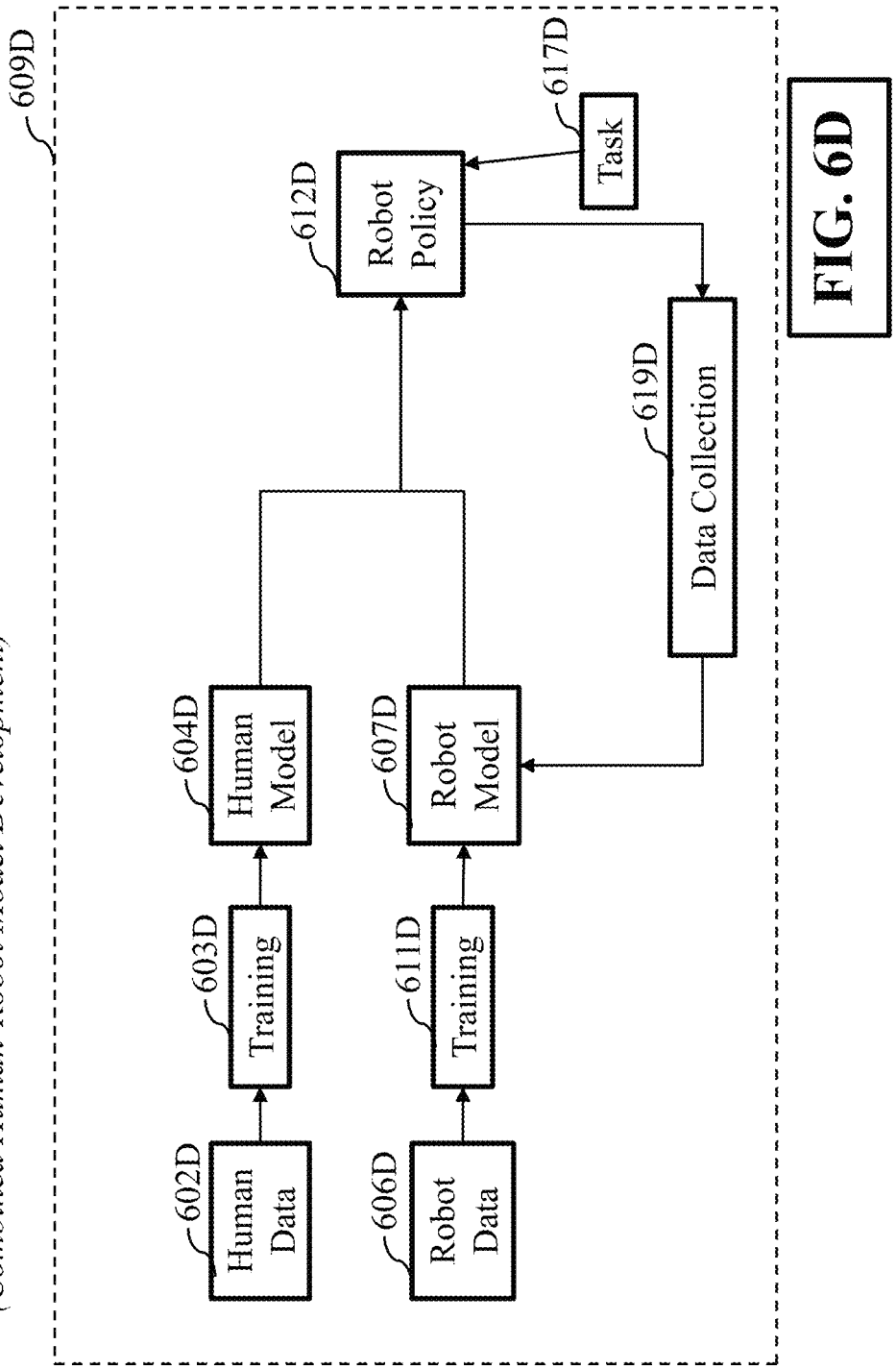

SYSTEMS AND METHODS FOR ADVANCE ANOMALY DETECTION IN A DISCRETE MANUFACTURING PROCESS WITH A TASK PERFORMED BY A HUMAN-ROBOT TEAM

FIELD

The present disclosure relates generally to systems and methods of model learning technologies, and more specifically to systems and designs of model learning technologies for a discrete manufacturing process where some steps in the process are executed by joint human-robot operation teams.

BACKGROUND

Conventional machine learning technologies can allow intelligent systems such as robots and personal assistants to acquire knowledge and solve difficult problems by learning from examples or instruction. However, there are many difficulties with these conventional learning models to control robotic systems in the fact that very complex physical laws, called Rigid Body Dynamics (RBD) and only a crude representation of these physical laws, govern the motion of a robotic system are usually known. Moreover, measurements of physical quantities need to compute these laws, such as position, velocity and acceleration of each component of the robot, which often is unavailable. Sensors mounted on the robotic systems typically only measure a position component (e.g. encoders, potentiometers, proximity sensors . . . ), while velocity and acceleration are not measured.

Some conventional machine-learning approaches tend to be from a subfield of computer vision, which poses a significant list of limitations in terms of applicability of a solution. For example, CN105389859A patent relates to a monitoring system for monitoring a sanitation worker at a working state. This method is based on intelligent lamppost applications that uses RFID and smart lampposts to monitor worker attendance. However, this these methods do not learn what the worker is doing and what the state of health of the worker might be.

Further, monitoring and controlling safety and quality are very important in manufacturing, where fast and powerful machines can execute complex sequences of operations at very high speeds. Deviations from an intended sequence of operations or timing can degrade quality, waste raw materials, cause down times and broken equipment, decrease output. Danger to workers is a major concern. For this reason, extreme care must be taken to carefully design manufacturing processes to minimize unexpected events, and safeguards need to be designed into the production line, using a variety of sensors and emergency switches. Some types of manufacturing are process and discrete manufacturing. In process manufacturing, products are generally undifferentiated, for example oil, natural gas and salt. Discrete manufacturing produces distinct items, e.g., automobiles, furniture, toys, and airplanes. A conventional approach to increasing the safety and minimizing the loss of material and output is to detect when a production line is operating abnormally, and stop the line if necessary in such cases. To implement this, the conventional approach is to use a description of normal operation of the production line in terms of ranges of measurable variables, for example temperature, pressure, etc., defining an admissible operating region, and detecting operating points out of that region. This conventional method is common in process manufacturing industries, for example oil refining, where there is usually a good understanding of permissible ranges for physical variables, and quality metrics for the product quality are often defined directly in terms of these variables. However, the nature of the working process in discrete manufacturing is different from that in process manufacturing, and deviations from the normal working process can have very different characteristics. Discrete manufacturing includes a sequence of operations performed on work units, such as machining, soldering, assembling, etc. Anomalies can include incorrect execution of one or more of tasks, or an incorrect order of the tasks. Even in anomalous situations, often no physical variables, such as temperature or pressure are out of range, so direct monitoring of such variables cannot detect such anomalies reliably.

Accordingly, there is a need to develop advanced technologies for learning systems that learn to characterize a discrete manufacturing process. In particular, there is a need to develop learning systems geared to discrete manufacturing processes whose sub-steps may be executed by joint human-robot teams. Here the learning system can operate at two levels, the first level is learning a method to optimize the process at a human-robot collaboration level that adjusts help that a robot can provide to a human worker, subject to a condition of the human worker. The second level, is at the system level that learns to detect anomalies in the total discrete manufacturing process given that some steps are executed by a robots and humans.

SUMMARY

The present disclosure relates generally to systems and methods of model learning technologies, and more specifically to systems and designs of model learning technologies for a discreet manufacturing process with steps executed by joint human-robot teams.

In particular, some systems and methods of the present disclosure overcome the conventional human-robot collaboration process problems by optimizing speed along a total manufacturing process, and optimizing the interaction between the human and robot to optimize speed and quality of the product. In addition, the systems and methods presented in this disclosure are capable of detecting anomalies in the total manufacturing process while taking into account the variation of conditions possible of the human worker.

The total manufacturing process is a discrete manufacturing process (DMP) where some steps are performed by joint human-robot teams. Here anomalies in the DMP, such as assembly lines, can also be detected according to the present disclosure. During training, data can be acquired during normal operation of the DMP. The normal operation can be understood as a description of normal operation of a production line in terms of ranges of measurable variables, for example temperature, pressure, etc., defining an admissible operating region, for a period of time without detection of abnormal operation out of the description of normal operation. Importantly, when some tasks in the process are executed by joint human-robot teams, normal operation includes work performed by a worker during the various possible physical states of that worker, ex. Healthy, tired, sick, sleepy, etc. Thus during normal operation of the DM, we observe also the normal range of operation of the worker. Such training data collection can be learned during test periods of a production line which allow for the determination of permissible ranges for physical variables, and quality metrics for product quality, among other measuring techniques, to determine the normal operation. Upon determining the normal operation of the production line, data obtained from sensors is obtained and processed to form a stream of discrete events. Wherein, an event relationship table for a normal operation is constructed from the events. Then, during on-line time processing, the table is used to detect anomalies in the operation of the DMP using data acquired in real-time. There are several advantages for developing the table. By non-limiting example, the table can represent the correct workflow or normal operation of the DMP. Second, in contrast to conventional modeling formalisms, such as finite automata, the table represents compactly and accurately multiple sub-processes that are performed in parallel. Such sub-processes can either be independent, or coordinated. Third, the table represents the coordination between multiple sub-processes.

Some embodiments about the human-robot interaction can include learning the typical or normal operation of a human worker performance, i.e. determining the typical motions performed by the human worker and the levels of alertness or fatigue experienced by the worker. Learning a personalized task execution model, which depends on, or is influenced by, the state of the human worker, was found to have many benefits. A first realization is that recognizing changes and anomalies in task execution and the state of the human worker can provide a much earlier anomaly detection in the human-robot manufacturing process as compared to conventional methods. That is, task execution and human health of the worker can provide the early warning of an impending manufacturing process anomaly. A second realization included the recognition that understanding of the typical performance and state of the human worker means that this information can be used in the collaboration between the robot and the human itself such that the combined human/robot performance can be improved. These improvements stein from an optimization of the interaction of the robot with the human worker. As a non-limiting example, if an anomaly can be detected in the performance level either of the human worker, or a state of health of the work, based upon a threshold approach. Then, in an assembly line environment where a robot assists a human in completing a task, early detection of the human worker's anomaly can alert the robot to change a robot action in order to accommodate for the human worker's anomaly. For example, the robot can slow its actions to match those of a tired human worker. Alternate examples of robot actions could include performing additional tasks, calling a supervisor for help, holding parts closer to the human worker (at the cost of additional time), improving the comfort of the immediate area by adding light, heating/cooling, etc., and others. This can be understood that the process control system can be designed to optimize the process at the human-robot collaboration level, by adjusting the help that the robot is providing to the human worker subject to the condition of the worker. In addition, the process control system knows a holistic description of the human/robot system; it is also capable of detecting future anomalies in a total manufacturing process. For example, during on-line time processing of the DMP, the table can be used to detect future/upcoming anomalies while the DMP is operating in real-time. The use of the table can lead to optimizing the speed of the total manufacturing process, correct workflow issues, as well as a quality of the manufactured product.

Some aspects anticipated in mixed Human-Robot assembly processes, are that it is insufficient to learn discrete anomaly models for the process, models of human behavior, and models of robot manipulation, independently. The realization here is that a system must be designed to utilize these components to jointly optimize the speed of the process and the quality of the product. Thus, learning human behavior to learn the precise method of work performed by the human is an important component in designing a process control system. To learn the method of work of the human worker, the worker must be outfitted with sensors that collect information about the ongoing work process (to be described below). In addition, the information collected from the human worker (ex. Arm motion) can be augmented by information in the process control system, by collecting task information such as task label (assembly, inspection, paint, stitch, etc.), expected task duration (typical duration, specified duration, etc.) and human worker skill level (can be expressed in years of employment). Together these features can be recorded in a training database and used to learn a model of the human performance.

Some embodiments of the present disclosure can learn human performance via machine learning methods that capture a description of the human worker performance in a statistical model. Here two types of models may be utilized: predictive models and classification models. Predictive models can be used to learn expected completion time, effectively capturing the patterns observed in sensor data that indicate how a human worker is performing a task. Classification models can be used to learn human worker state (ex. Energetic, tired, slow, etc.) or task performed (assembly, inspection, paint, stitch, etc.).

Some embodiments of the present disclosure summarize the knowledge gained from the predictive models and classification models by creating anomaly detection mechanisms and predicting task completion times. For example, when multiple concurrent processes are taking place, using event relationship tables it is possible to generate sequences of possible steps in the human-robot manufacturing process. This information characterizes the human-robot manufacturing process. For a fixed execution time, these tables allow us to generate the exact sequence of normal events in a human-robot manufacturing process. Importantly the sequence of events is deterministic with each event following a single prior event. However, if one or more events have variable completion times, then multiple events may follow any single event. Here a number of possible event sequences can be generated to represent normal completions of the DMP. Using the predicted task completion time, and the event transition tables, or generated complete sequences of a DMP, it is now possible to anticipate an anomaly in the process based on the current state of the worker and the human-worker collaboration. In other words, given the current predicted completion time, the sequence of events that will occur either do not complete the DMP in the event transition table or is not a member of the possible normal sequences of operation of the DMP.

For example, when using these anomaly detection tables and the predicted task completion time it is possible to anticipate an anomaly that will occur in the process. This occurs when a sequence of events in the future does not match a valid sequence in the anomaly detection table. Suppose the human robot team is predicting a normal completion time of the task. Then the event sequences generated from this moment until the completion of the process using the event transition table will be complete. However, suppose now that the predicted completion time of a task is too long. In this case the event sequences generated using the event transition table will be incomplete. This means that the long event duration led to an illegal transition from one event to the next in the event transition table, and thus the process was not completed. By this manner, being unable to generate a complete manufacturing event sequence, we know that there is an upcoming anomaly in the DM and that it stems from the joint human-robot task.

Detection of an immediate problem with the human worker can be completed using the classification algorithms. Wherein the classification algorithm can determine a current task that is performed by the human worker and the next worker task that is extracted from current human worker signals. The classification algorithm (i.e. which is part of a Human Performance model) determines the state of the human worker. Then, based on previously learned boundaries of different types of anomalies and no anomalies learned from human worker data by the classification algorithm along with the state of the human worker, obtains an anomaly classification or no anomaly. A Human-Robot Interaction (HRI) model is updated with current robot operation signals, the current human worker signals and the classified anomaly. Wherein a control action of a robot interacting with the human worker or a type of an anomaly alarm using the updated HRI model and the classified anomaly can be determined. Here either an anomaly alarm can be given or an action of the robot helper can be altered to improve the human worker performance. The robot can then learn to alter its behavior by being provided examples of correct behavior given a level of human performance, including in real-time. Importantly, this anomaly alarm can also be triggered ahead of time, before the anomaly occurs because predictions issued by a human performance model can generate future sequences of task executions. As will be discussed later, these examples can be explicitly provided or discovered during a learning procedure.

Another optional approach may include using the classification algorithm to compare the predicted task and action to an expected task and action from the control system pre-trained and stored in a memory, and a decision can be rendered on the state of the human worker.

Another aspect of developing the systems and methods of the present disclosure can include combining the robot learning with human performance monitoring. Experimentation included better understanding of the interaction between the robot and the human during the human-robot manufacturing process. At least one realization was to learn this interaction using statistical models (machine learning) which were capable of making inferences and reacting to the ongoing interaction between the robot and the human operator. To learn these models data was collected from built-in sensors on the robots and from external sensors like cameras. The external sensors can be the same sensors previously used to learn the characterization of the human collaborator, by non-limiting example. The learned model can then use to determine a control method of the robot, which is capable of interacting with the Human collaborator during his/her unique physical states (Energized, tired, slow, etc.). Importantly, this collaboration is learned with the goal of completing the human-robot manufacturing task and maximizing product quality. For example, the robot can learn to alter its behavior by being provided examples of correct behavior given a level of human performance. As will be discussed later, these examples can be explicitly provided or discovered during a learning procedure.

According to an embodiment of the present disclosure, a process control system for detecting an anomaly in a discrete manufacturing process (DMP) with human-robot teams executing at least one task within the process. The process control system including a memory configured to store data including robot data, manufacturing process (MP) data, human data, and executable models. An input interface configured to receive signals including DMP signals from DMP sensors that includes robot operational signals, and human worker (HW) signals from HW sensors. A hardware processor in communication with the memory and input interface is configured to extract a predicted sequence of events from the DMP signals. Determine whether the predicted sequence of events in the DMP signals is inconsistent with a behavior of operation of the DMP described in a DMP model, and if the predicted sequence of events from the DMP signals is inconsistent with the behavior, then an alarm is to be signaled. Extract from the HW signals, a task completion time, measurements relating to a state of the HW and a next predicted sequenced task, and input into a Human performance (HP) model. The HP model determines the state of the HW based on previously learned boundaries of the state of the HW, the human state is then inputted into a Human-Robot Interaction (HRI) model, and outputs from the HW model, the HRI model, or both, are inputted into the DMP model to determine a classification of anomaly or no anomaly. Update the HRI model with the robot operation signals, the HW signals and the classified anomaly. Determine a control action of a robot interacting with the HW or a type of an anomaly alarm using the updated HRI model and the classified anomaly. An output interface to output the control action of the robot to change a robot action, or output the type of the anomaly alarm to a management system of the DMP, based on the updated HRI model and the classified anomaly.

According to an embodiment of the present disclosure, a method for a process control system for detecting an anomaly in a discrete manufacturing (DMP) with human-robot teams executing at least one task within the process. The method can include steps of: receiving test signals having DMP signals from DMP sensors that includes robot operational signals, and human worker (HW) signals from HW sensors including a time series of measurements of tasks completed by the HW. Predicting a sequence of events from the DMP signals and an expected human-robot team completion time. Determining whether this predicted sequence of events in the DMP signals is inconsistent with a behavior of an operation of the DMP as described in a DMP model. Such that, if the predicted sequence of events from the DMP signals is inconsistent with the behavior, then an alarm is to be signaled. Extracting from the HW signals, a task completion time, a task name, measurements relating to a state of the HW performance and a next predicted sequenced task, and input into a Human Performance (HP) model obtained from previous Human data, to obtain a state of the HW performance based on previously learned boundaries of the state of the HW; the state of the HW is then input into a Human-Robot Interaction (HRI) model, and outputs from the HW model, the HRI model, or both, are inputted into the DMP model to determine a classification of anomaly or no anomaly. Updating the HRI model obtained from previous Human-Robot data with the robot operation signals, the HW signals and the classified anomaly. Then, determines a control action of a robot interacting with the HW or a type of an anomaly alarm using the updated HRI model and the classified anomaly. Outputting the control action of the robot to change a robot action, or output the type of the anomaly alarm to a management system of the DMP, based on the updated HRI model and the classified anomaly. Wherein the steps are implemented by a hardware processor connected to a memory.

According to an embodiment of the present disclosure, a non-transitory computer readable storage medium embodied thereon a program executable by a computer for performing a method for a process control system for detecting an anomaly in a discrete manufacturing process (DMP) with human-robot teams executing at least one task within the process. The method having some steps of receiving test signals that includes DMP signals from DMP sensors that includes robot operational signals, and human worker (HW) signals from HW sensors including a time series of measurements of tasks completed by the HW. Predicting a sequence of events from the DMP signals and an expected human-robot team completion time. Determining whether this predicted sequence of events in the DMP signals is inconsistent with a behavior of an operation of the DMP described in a DMP model. Such that, if the predicted sequence of events from the DMP signals is inconsistent with the behavior, then an alarm is to be signaled. Extracting from the HW signals, a task completion time, measurements relating to a state of the HW and a next predicted sequenced task, and input into a Human Performance (HP) model obtained from previous Human data, to obtain a state of the HW based on previously learned boundaries of the state of the HW; the state of the HW is then inputted into a Human-Robot Interaction (HRI) model, and outputs from the HW model, the HRI model, or both, are inputted into the DMP model to determine a classification of anomaly or no anomaly. Updating the HRI model obtained from previous Human-Robot data with the robot operation signals, the HW signals and the classified anomaly. Then, determine a control action of a robot interacting with the HW or a type of an anomaly alarm using the updated HRI model and the classified anomaly. Outputting the control action of the robot to change a robot action, or output the type of the anomaly alarm to a management system of the DMP, based on the updated HRI model and the classified anomaly. Wherein the steps are implemented by a hardware processor connected to a memory.

BRIEF DESCRIPTION OF THE DRAWINGS

The presently disclosed embodiments are explained with reference to the attached drawings. The drawings are not necessarily to scale, with emphasis instead placed upon illustrating the principles of the presently disclosed embodiments.

FIG. 2B is a table illustrating a diagram of a log-based ordering relationship table, according to some embodiments of the present disclosure; and FIG. 2C is a schematic illustrating a diagram of a method for detects anomalies from the event sequences by determining consistency between the sequence and the model, according to some embodiments of the present disclosure.

FIG. 3B is a schematic diagram illustrating some data collection from sensors that monitor human worker performance tasks, according to some embodiments of the present disclosure;

FIG. 6A is a schematic diagram illustrating interaction between the robot and the human during the human-robot manufacturing process, according to some embodiments of the present disclosure;

FIG. 6B is a block diagram illustrating combining the human model and the robot model into a joint model, according to some embodiments of the present disclosure;

FIG. 6C is a block diagram illustrating combining the human model and the robot model into a joint model, which includes training the human model using data collected from the human worker, according to some embodiments of the present disclosure;

FIG. 6D is a block diagram illustrating learning an individual model for both the human and robot, then learns a joint model that is used to improve the robot policy and finally, this robot policy can be used during the operations;

While the above-identified drawings set forth presently disclosed embodiments, other embodiments are also contemplated, as noted in the discussion. This disclosure presents illustrative embodiments by way of representation and not limitation. Those skilled in the art can devise numerous other modifications and embodiments, which fall within the scope and spirit of the principles of the presently disclosed embodiments.

DETAILED DESCRIPTION

The present disclosure relates generally to systems and methods of model learning technologies, and more specifically to systems and designs of model learning technologies for joint human-robot manufacturing process.

Figure 1A:
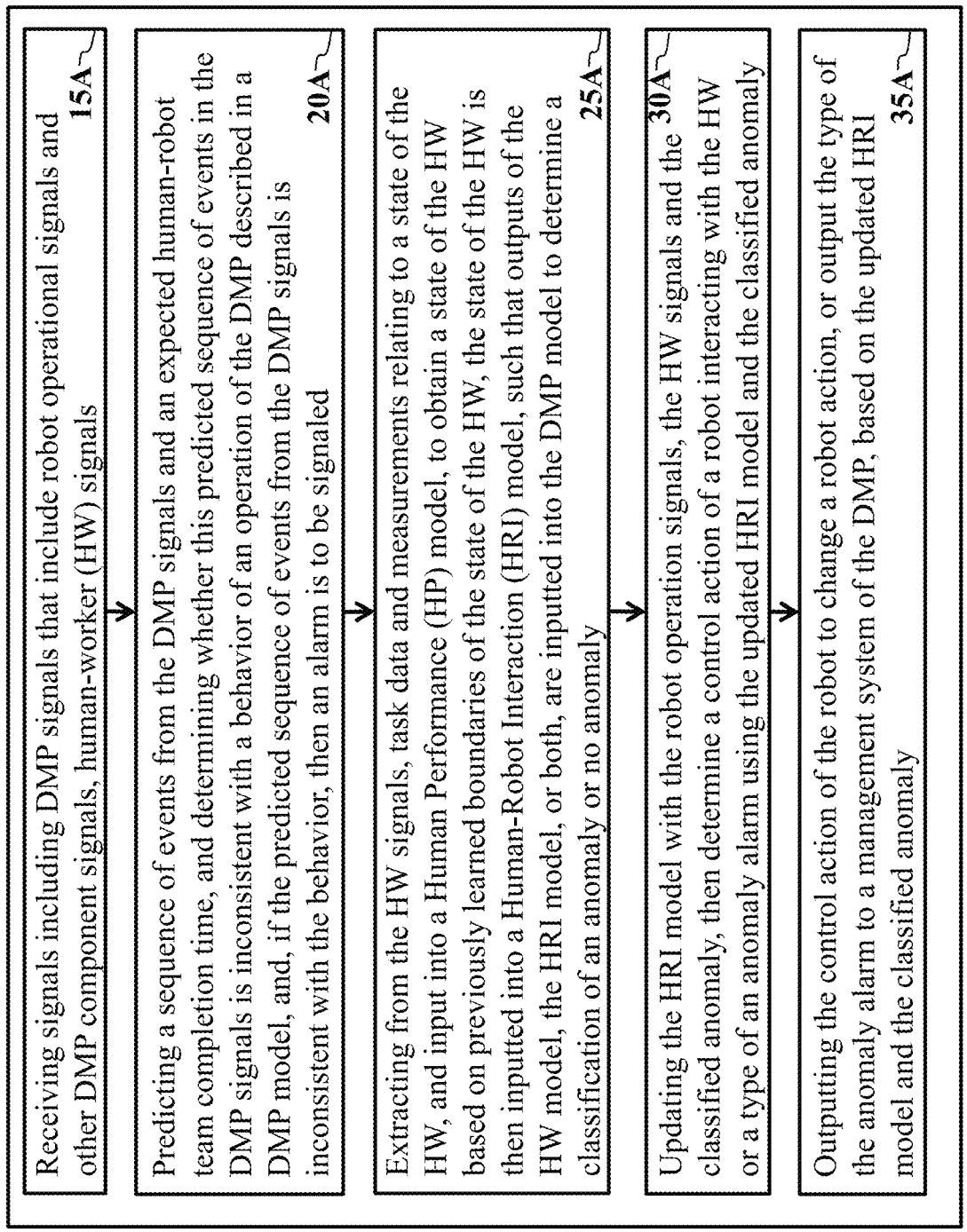
FIG. 1A is a block diagram illustrating a method, according to an embodiment of the present disclosure.

FIG. 1A is a block diagram of a method, according to an embodiment of the present disclosure, that includes a process control system for detecting an anomaly in a discrete manufacturing (DMP) with human-robot teams executing at least one task within the process. The process control method can detect anomalies in an execution of a task in a sequence of tasks in a discrete manufacturing process (DMP) where some tasks are performed by joint human-robot teams. Some of the steps include:

Step 15A of FIG. 1A, receiving test signals that includes DMP signals from DMP sensors that includes robot operational signals and other DMP component signals, and human worker (HW) signals from HW sensors including a time series of measurements of tasks completed by the HW.

Step 20A of FIG. 1A includes predicting a sequence of events from the DMP signals and an expected human-robot team completion time, and determining whether this predicted sequence of events in the DMP signals is inconsistent with a behavior of an operation of the DMP described in a DMP model, and, if the predicted sequence of events from the DMP signals is inconsistent with the behavior, then an alarm is to be signaled.

Step 25A of FIG. 1A illustrates extracting from the HW signals, task data and measurements relating to a state of the HW, and input into a Human Performance (HP) model obtained from previous Human data, to obtain a state of the HW based on previously learned boundaries of the state of the HW, the state of the HW is then inputted into a Human-Robot Interaction (HRI) model, and outputs from the HW model, the HRI model, or both, are inputted into the DMP model to determine a classification of anomaly or no anomaly.

Step 30A of FIG. 1A includes updating the HRI model obtained from previous Human-Robot data with the robot operation signals, the HW signals and the classified anomaly, then determine a control action of a robot interacting with the HW or a type of an anomaly alarm using the updated HRI model and the classified anomaly.

The control action can include one or a combination of: (a) adjusting an amount of a robot speed according to the state of the human-worker; (b) adjusting a direction of the robot including one or a combination of an X-axis direction, Y-axis direction or Z-axis direction; or (c) initiating an audible voice command such as indicating a change of robot operation according to the control action. Contemplated is that other control actions may include maintenance related actions for the robot, safety related actions to both the human and the robot, as well as diagnostic related actions for the robot. Further, some classifications of anomaly detections can be associated with robot actions such as levels of speed of the robot, movements of the robot, voice announcements, making calls, maintaining robot positions for one or more periods of time, adjusting environmental conditions via commands sent to a controller. Other classifications of anomaly detections can include types of anomalies such as detection of future anomalies, maintenance related anomalies, safety related anomalies, lost production anomalies, failure of components anomalies, quality anomalies and assembly line anomalies.

Step 35A of FIG. 1A includes outputting the control action of the robot to change a robot action, or output the type of the anomaly alarm to a management system of the DMP, based on the updated HRI model and the classified anomaly, wherein the steps are implemented by a hardware processor connected to a memory. Also contemplated is outputting the signaled alarm upon receiving the determination that the sequence of events is inconsistent with the behavior of the operation to a management system of the mixed human-robot processes.

Some types of anomaly alarms can be anomaly alarms intended for immediate actions, however, more importantly, this anomaly alarm can also be triggered ahead of time, before a more major or detrimental anomaly occurs because predictions can be discovered by the human performance model, Human-Robot Interaction model and the DMP model, can generate future sequences of task executions. Some examples of the immediate or future anomaly alarms can include one or a combination of, a suspected assembly line mechanical failure, a suspected material supply problem to the assembly line, an under production problem due to the HW, a suspected robot related problem, an operator related task or a suspected electronic failure.

According to some embodiments of the present disclosure, some advantages of the systems and methods of the present disclosure overcome the conventional human-robot collaboration process problems by optimizing speed along the total manufacturing process, and optimizing the interaction between the human and robot to optimize speed and quality of the product. This can be accomplished by optimizing the process at the human-robot collaboration level by adjusting the help that the robot is providing to the human worker subject to the condition of the worker. In addition, the embodiments presented in this disclosure provide a forward looking anomaly detection in the total manufacturing process which was not previously possible without learning a detailed model of the human worker.

Figure 1B:
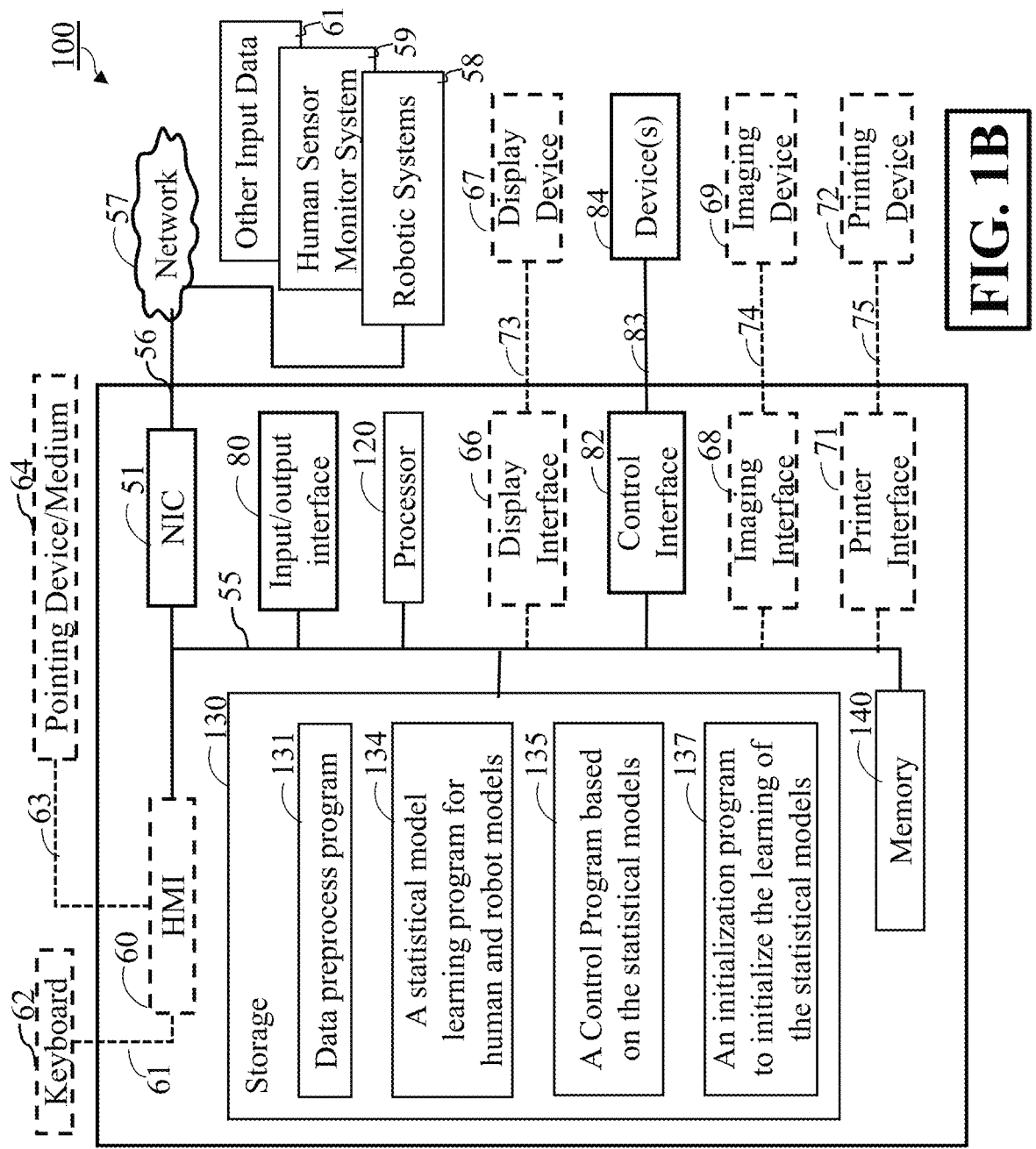
FIG. 1B is a schematic illustrating some components used for implementing the method of FIG. 1A, according to some embodiments of the present disclosure.

FIG. 1B is a schematic illustrating some components used for implementing the method of FIG. 1A, according to some embodiments of the present disclosure. For example, FIG. 1B can be used for implementing embodiments of the robot-human models combined together.

FIG. 1B includes a process control system 100 used for controlling a robotic system 58 via bus 55, that may include a network interface controller (NIC) 51 adapted to connect through a bus 56 to a network 57. Wherein data can be communicated to and/or from the robotic system 58, i.e. robotic systems, and data 59 including input measurements such as those used to monitor the human worker and other possible data. A memory 140 can be used to store computer-executable programs in a storage 130 including a data preprocess program 131, a statistical model learning program for human and robot models 134, a Control Program based on the statistical models 135, an initialization program to initialize the learning of the statistical models 137, and a processor 120 (or more than one processor), in connection with the memory 140. Also, stored in the storage 130 can be object state history data (not shown) and robot state history data (not shown). There can be components including an input/output interface 80, control interface 82 connected to devices 84 via bus 83.

Some optional components of the process control system can include a human machine interface (HMI) 60 connected via bus 61 to a keyboard 62 and bus 63 to pointing device/medium 64. Other optional components can include a display interface 66 connected via bus 73 to display device 67, imaging interface 68 connected via bus 74 to imaging device 69, printer interface 71 connected via bus 75 to printing device 72.

Figure 1C:
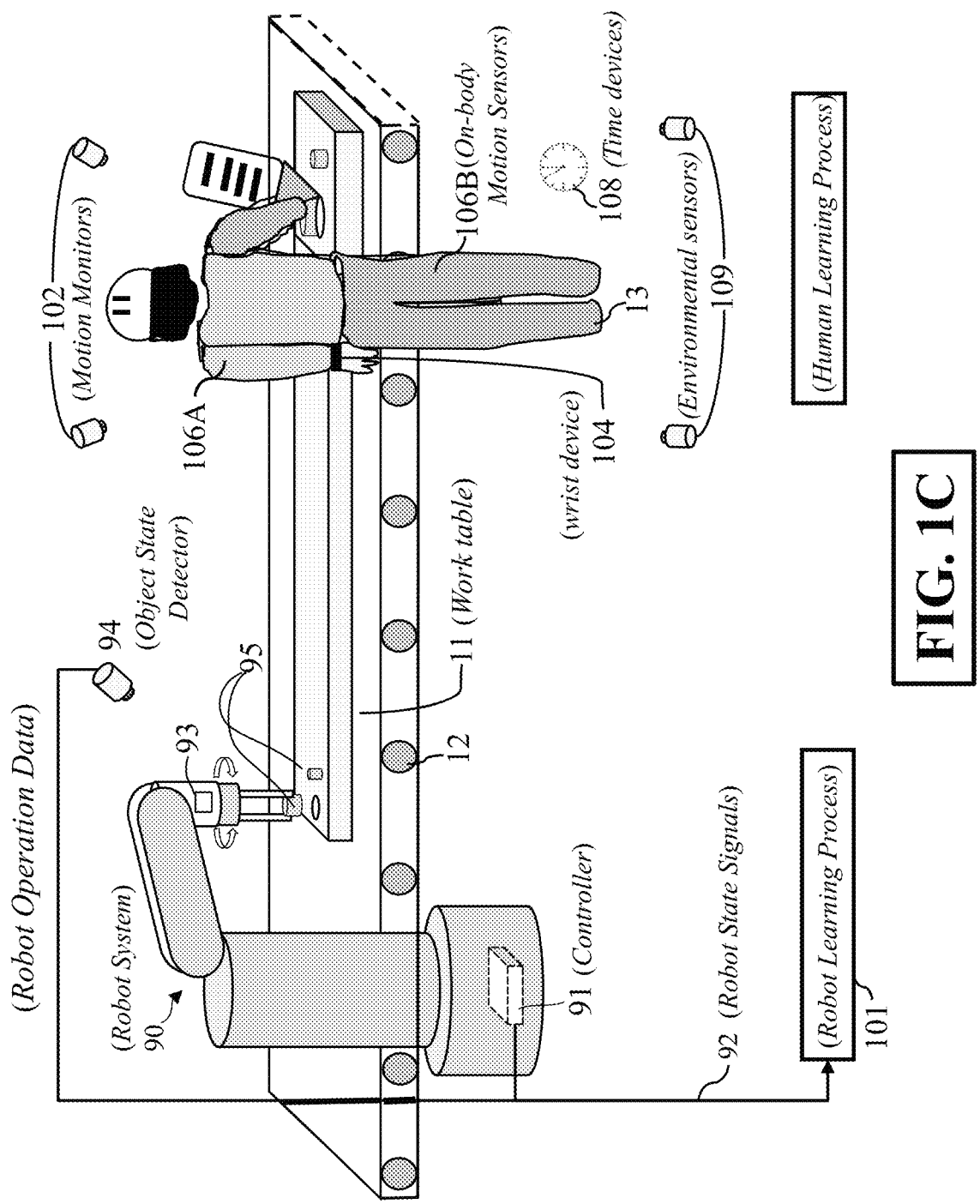
FIG. 1C is a schematic diagram illustrating a robot system and a human worker executing a task in an assembly line of a discrete manufacturing process, according to some embodiments of the present disclosure.

FIG. 1C is a schematic diagram illustrating a robot system and a human worker in an assembly line of a discrete manufacturing process performing a discrete task, according to embodiments of the present disclosure. In later figures, a model of human performance, a robot learning process and other processes will be explained in detail. Contemplated is that the assembly line includes multiple stations and at each station includes at least one task to be completed by at least one robot that assists at least one human worker to complete the at least one task.

The robot system 90 includes a controller 91, a robot state detector for example a positional encoder 93, wherein the positional encoder 93 can produce robot state signals 92. The robot system 90 can also include an object state detector for example a camera 94, wherein the camera 94 can produce object state signals of an object 95 to be manipulated by the robot system 90 in a workspace or conveyor 12 of a worktable 11. Wherein the robot system 90 assists at least one human worker 13 in completing at least one task on the worktable 11, such that the workspace or conveyor is capable of moving in a forward direction and a reverse direction in order to assist either the robot or human worker in completing the task. Note that these components 11-12 and 90-94 are here represented as an example but they might vary for different applications since the embodiment of the present disclosure is robust to different applications. In addition, the robot operational data can optionally, depending upon a user specific interest, be sent or received wirelessly to a robot learning process 101.

Still referring to FIG. 1C, a human worker 13 can have sensors for gathering data including a wrist device 104, motion monitors 102, on-body motion sensors 106A, 106B, time devices 108 and environmental sensors 109. The data from these devices facilitates the learning process for the models specific to the human worker. These sensors all together are an example of the human state detector. The human states are considered together with the state of the object to be manipulated 95 and with the state of the robot system 90 to learn the control policy of the robot.

Anomaly Detection in Discrete Manufacturing Processes (DMP)

Figure 2A:
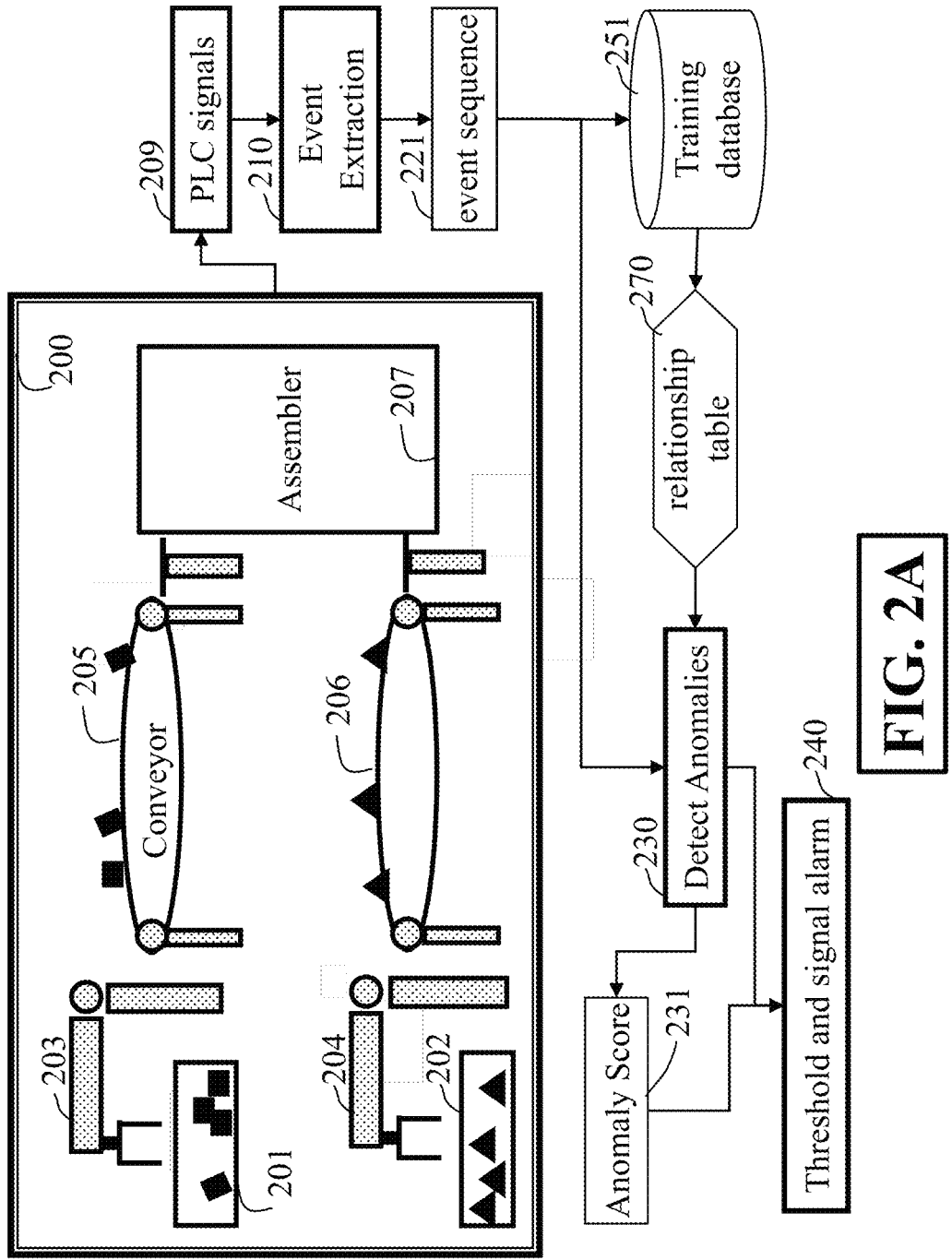
FIG. 2A is a schematic illustrating a diagram of a method for detecting anomalies in a discrete manufacturing process s(DMP), according to some embodiments of the present disclosure.

FIG. 2A shows a method for detecting anomalies in a discrete manufacturing process (DMP) 200 according to embodiments of the present disclosure. Note that this DMP does not have any human workers in the process. The embodiments of the present disclosure provide a method for detecting anomalies in discrete manufacturing processes (DMP), such as assembly lines. During training, data are acquired during normal operation of the DMP. The data are processed to form a stream of discrete events. An event relationship table for a normal operation is constructed from the events. Then, during on-line time processing, the table is used to detect anomalies in the operation of the DMP using data acquired in real-time.

The table has several advantages. First, the table can represent the correct workflow or normal operation of the DMP. Second, in contrast to conventional modeling formalisms, such as finite automata, the table represents compactly and accurately multiple sub-processes that are performed in parallel. Such sub-processes can be either independent, or coordinated. Third, the table represents the coordination between multiple sub-processes.

Some embodiments include off-line training and real-time processing. The training can be a one-time preprocessing task. Alternatively, the training is done as needed, e.g., to adapt to changing processing conditions. The method can be performed in a processing device connected to memory and input/output interfaces by buses as known in the art.

The DMP includes bins 201-202, manufacturing robots 203-204, conveyors 205-206 and an assembler 207. During operation, the robots pick parts from the bin, and place the parts on the conveyor to be assembled.

Training: During training, signals 209 are acquired from various sensors, switches, and the like used by the DMP. The sensors can be connected to the various operational components of the DMP, e.g., the bins, robots, conveyer and assembler.

A sequence of events 221 is extracted 210 from the signals. The events are stored in a training database 251. The events are used to build a relationship table 270 of log-based ordering relations between all pairs of observed events of the normal operation of the DMP based on the table 270.

Detecting: The table is used to detect 230 anomalies in the signals 209 acquired in real-time by determining an anomaly score 231. If the score exceeds a predetermined threshold, then an alarm can be signaled 240.

Machine learning: The present disclosure uses machine learning to construct a relationship table of the event sequence from data measurements. These measurements are obtained from factory devices, robots, and workers.

Event sequence: The first step of the method is to acquire such signals from all devices, workers and robots in the DMP.

Relationship table: In practice, the relationship table can be built by means of a simple and efficient two-step procedure. Initially, all entries in the relationship table are initialized with the $\not>$ symbol. During the first step, the database is scanned sequentially, and for any pair of events where one event immediately follows another event, the corresponding entry of the relationship table is changed to the $>$ symbol. After the first step, any two events can be either in the $>$ or the $\not>$ relations. During the second step, the derived relations $\rightarrow$, $\leftarrow$, $\|$, and # are computed on the basis of the relations $>$ and $\not>$ discovered during the first step, using the following rules:

A$\rightarrow$B if A$>$B and B$\not>$A;
A$\leftarrow$B if A$\not>$B and B$>$A;
A$\|$B if A$>$B and B$>$A; and
A #B if A$\not>$ B and B$\not>$A.

FIG. 2B is a table illustrating a diagram of an example log-based ordering relationship table, according to some embodiments of the present disclosure. It is noted that the anomaly detection is based on the relationship table, and not a complex complete mined model as in the prior art. The relationship table is not a model. Instead, the relationship table represents summary statistics of the data logs about the discovered positional relationships between pairs of events during normal operation of the DMP as represented by a log-based ordering relationship table. Task duration: The task duration is a difference between the time of the current task and the latest time among the events corresponding to all predecessor tasks of the current task in the event trace. For example, in an event trace contains events (t1, Op2), (t2, Op1), (t3, Op3), with t1<t2<t3, then the duration of task Op3 is d(Op3)=t3-t2, because Op1 and Op2 are both predecessors of Op3 in the SWN, and Op1 occurred later at time t2, thus enabling the task Op3 at that time, with the corresponding event emitted t3-t2 time later. Note that the event corresponding to a given task can be emitted at the beginning, end, middle, or a random time during the task. When the event is always emitted at the end of each task, the collected task durations d actually represents the execution times of the respective tasks. In any of the other cases, the task duration only includes the time until the corresponding event is emitted, but may also include the time between one or more predecessor tasks emitted their events and actually were completed. Regardless of which case is present in a DMP, the task durations are an important property of the process and can be included in its model for the purposes of anomaly detection.

Optionally, task durations for robot tasks can be included in the model in several ways. One way is to determine the minimal dmin(T) and maximal dmax(T) durations for the tasks, and record the durations with the task descriptor. Another way is to assume a specific parametric form for the probability distribution fT(d) over the possible durations d of task T, such as a Gaussian, Beta, or Weibull distribution, and determine the corresponding parameters for that distribution, e.g., for example, mean and standard deviation for the Gaussian distribution. For simple operations, task duration can be approximated as the mean of the Gaussian distribution.

Real-Time Anomaly Detection: FIG. 2C is a schematic illustrating a diagram of a method for detects anomalies from the event sequences by determining consistency between the sequence and the model, according to some embodiments of the present disclosure. The real-time processing has two stages: determining 210 whether the sequence of events 221 are consistent with normal operation as represented by the model; and determining 220 whether the task durations are consistent with the table. We note here that this is for the robot executed tasks only. It can be determined whether the sequence of events is consistent with the model, and if the sequence is inconsistent, a maximal anomaly score Smax 311 can be assigned to the sequence.

Another method for verifying the correctness of the sequence of tasks is to compare the relative order of tasks, as they are observed in the event stream, with the entries of the log-based ordering relation table 270 constructed during the training phase. For example, if the sequence of events AB is observed, but the relation A≯B is present in the relation table, an anomaly can be signaled. Recall that A≯B signifies that A was never followed by B in the training database; if such behavior is observed currently, it is clearly inconsistent with the training data.

Combining with Discrete Anomaly Detection Method

The above method relies on event relationship tables that describe the sequence of events that occur. Critically, when multiple concurrent processes are taking place, these tables capture the timing information that describes the range of possible sequences in the manufacturing process. This information is the characterizing information that describes the manufacturing process.

For a fixed execution time, these tables allow us to generate sequences of normal events in a manufacturing process. Importantly the sequence of events is deterministic with each event following a single prior event. However, if one or more events are variable, then multiple events may follow any single event. Using these anomaly detection tables and the predicted task completion time it is then possible to anticipate an anomaly that will occur in the process. This occurs when a sequence of events in the future does not match a valid sequence in the anomaly detection table. As an example, suppose the human robot team is predicting a normal completion time of the task. Then the event sequences generated from this moment until the completion of the process using the event transition table will be complete. However, suppose now that the predicted completion time of a task is too long. In this case the event sequences generated using the event transition table will be incomplete. This means that the long event duration led to an illegal transition from one event to the next in the event transition table, and thus the process was not completed. By this manner, being unable to generate a complete manufacturing event sequence, we know that there is an upcoming anomaly in the DM and that it stems from the joint human-robot task.

The detection of an immediate problem with the worker can be completed using the classification algorithms. As an example, a procedure is shown in FIG. 2C. Here the classification algorithm determines the current task that is performed by the worker and the next worker task. Examples of such algorithms include worker gaze detection algorithms that can determine if the user is focused on his/her on-going task. The predicted task and action is compared to the expected task and action from the control system and a decision is rendered on the state of the worker. As an example, suppose that the control system knows, whether from the event transition table or by design, that the current task to be executed is welding. Suppose then that the classification algorithm is consistently at each time step determining that the worker is welding and that the prediction algorithm is predicting an ordinary completion time, then the worker must be healthy. On the other hand, suppose the classification system is vacillating in its decision between welding and cutting, and the prediction of the completion time is very long, then the worker must be tired. As more data is collected about the worker these states can be refined as well as related to the degradation of the statistical model performance. For example, initially the model will always determine that the worker is tired, but a model can be trained to take into account past decisions as well as the current state. Then as more data is collected, the model can determine that a worker is, for example, becoming tired vs has arrived at work tired.

It is important to note that the detection of a problem with the worker can be treated as whole process anomaly or as an action given to the robot helper is altered to improve the worker performance. In fact, prior to declaring an anomaly on the DMP, the robot controller should have taken steps to aid the human worker. To this end, the human prediction/classification models can be used either: in the controller which combines the robot model and the human model, or as additional dimensions in the robot learning state space. The latter is an important realization because it facilitates automatic learning of the type of help provided by the robot. That is, the robot may learn specific actions to take in each of the human health states to improve the final product quality and speed of the manufacturing process. As noted above, FIG. 2C shows the process of learning the model of human performance and then exploiting the model of human performance. In the first step of learning the historical database of data collected using the approach shown in FIG. 2B can be accessed. Here the historical database can be used to learn both the predictive and the classification models.

Learning Models of the Human Worker

Figure 3A:
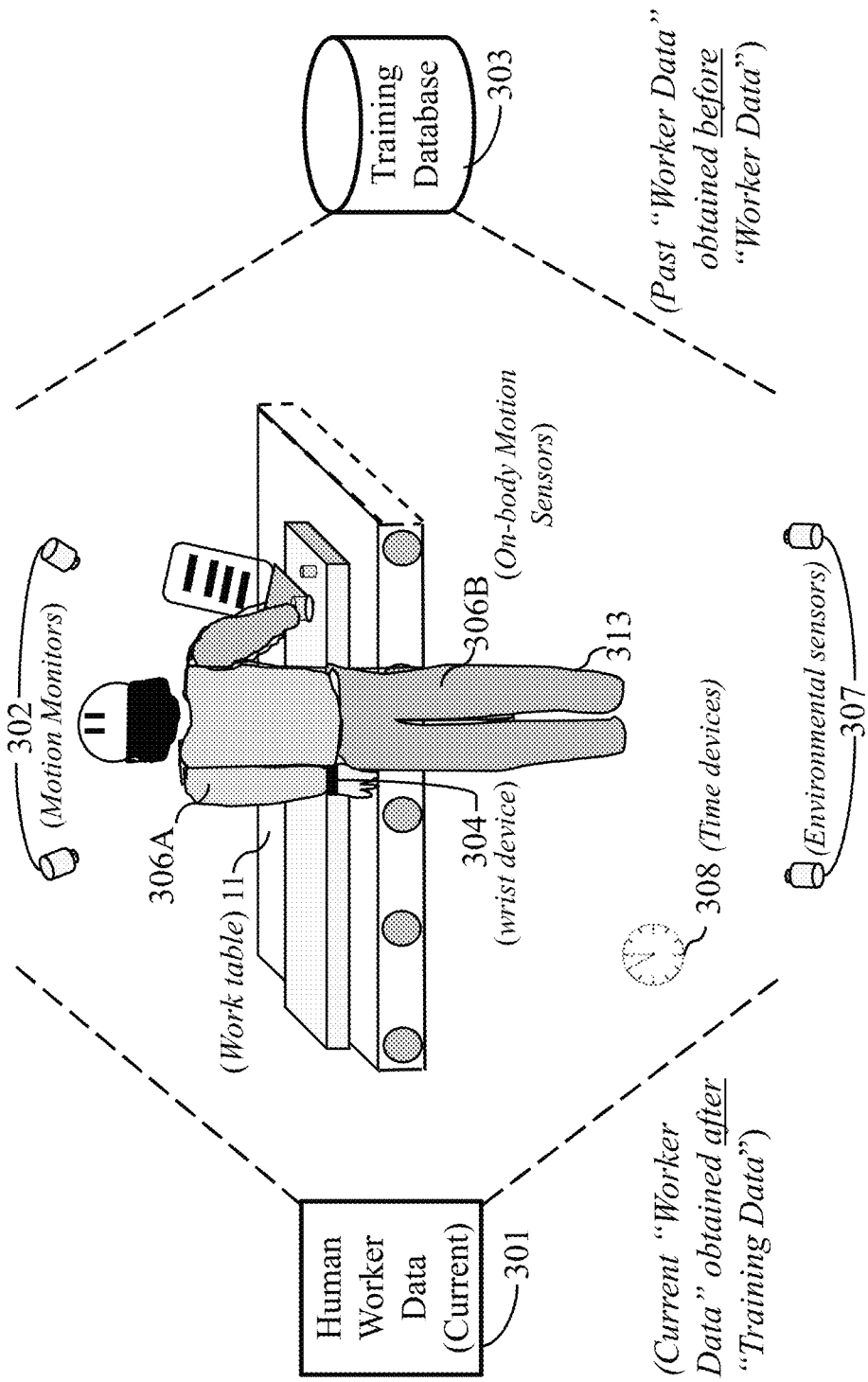
FIG. 3A is a schematic diagram illustrating data collection from the sensors associated with the human worker to obtain training data to be stored in a training database, and after the collection of the training data, obtain current human worker data, according to some embodiments of the present disclosure.

FIG. 3A is a schematic diagram illustrating data collection from the sensors associated with the human worker to obtain training data to be stored in a training database 303, and after the collection of the training data, obtain current human worker data 301, according to embodiments of the present disclosure. For example, the human worker 313 can have a sensor such as a wrist device 304 or some other human body sensor, i.e. attached to or embedded into, the worker 313, and can collect data such as body temperature, blood pressure, heart rate/pulse, breather rate, $O_2$ saturation, skin conductance and skin temperature.

Other sensors such as motion monitors 302, on-body motion sensors 306A, 306B, can collect biometric data such as behavioral identifiers such as physical movements, engagement patterns, physical movements, and physical identifiers such as photos and videos, physiological recognition, voice and boy attributes. Also other sensors can collect time stamp data via time devices 308 and environmental data from environmental sensors 307, such data can include air temperature, air velocity, humidity, air quality and radiant temperature.

FIG. 3B is a schematic diagram illustrating some data collection from sensors that monitor worker performance tasks 311, according to embodiments of the present disclosure. Wherein the data collected can be used for learning a normal or typical operation method of a human worker along with a typical state of the worker. Some of the data collected is from sensors that monitor worker performance tasks that can include external sensors can be used to monitor motion 317, such as using gaze detectors, biometric data 315, environmental sensors 307, time stamps 308 and on-body motion sensors 306A, 306B. Also, included for worker performance task data 320 includes historical task process information, such as task information 322 that is previously stored in a memory 140 of FIG. 1B. The data collected for the process control system can be task labelling (assembly, inspection, paint, stitch, etc.), expected task durations (typical duration, specified duration, etc.) and worker skill levels (can be expressed in years of employment), by non-limiting example.

The environmental data sensing may include an I/O module, which may include wireless communication components or an on-device user interface, a data processor or control module, a power supply that may be a removable or rechargeable battery, or a wireless power converter. The environmental data sensing may include one or more sensors that measure various characteristics of the environment, such as air temperature, air velocity, humidity, air quality 328 and/or radiant temperature. Additionally, sensors such as, but not limited to, turbulence and $CO_2$ sensors are included in the environmental data sensing. The one or more sensors are located at the vicinity of the worker. Although indicated as separate items, it is contemplated that a single sensor of the environmental data sensing may measure more than one variable. For example, an omnidirectional anemometer may be used to measure air velocity as well as turbulence intensity. In another example, the radiant temperature may be determined based on data from an IR camera or by using a separate sensor, such as a glob thermometer. In some embodiments, the environmental data may include a model of the environment and distributions of variables of the model of the environment. The model of the environment includes location of windows and location of doors and walls and the variables of the model of the environment indicate whether the windows and the doors are open or closed. Further, the model of the environment includes a location and a type of a heat source (computer, oven, workers, etc.) in the environment and the variables of the model of the environment indicate a state of the heat source.

Figure 3C:
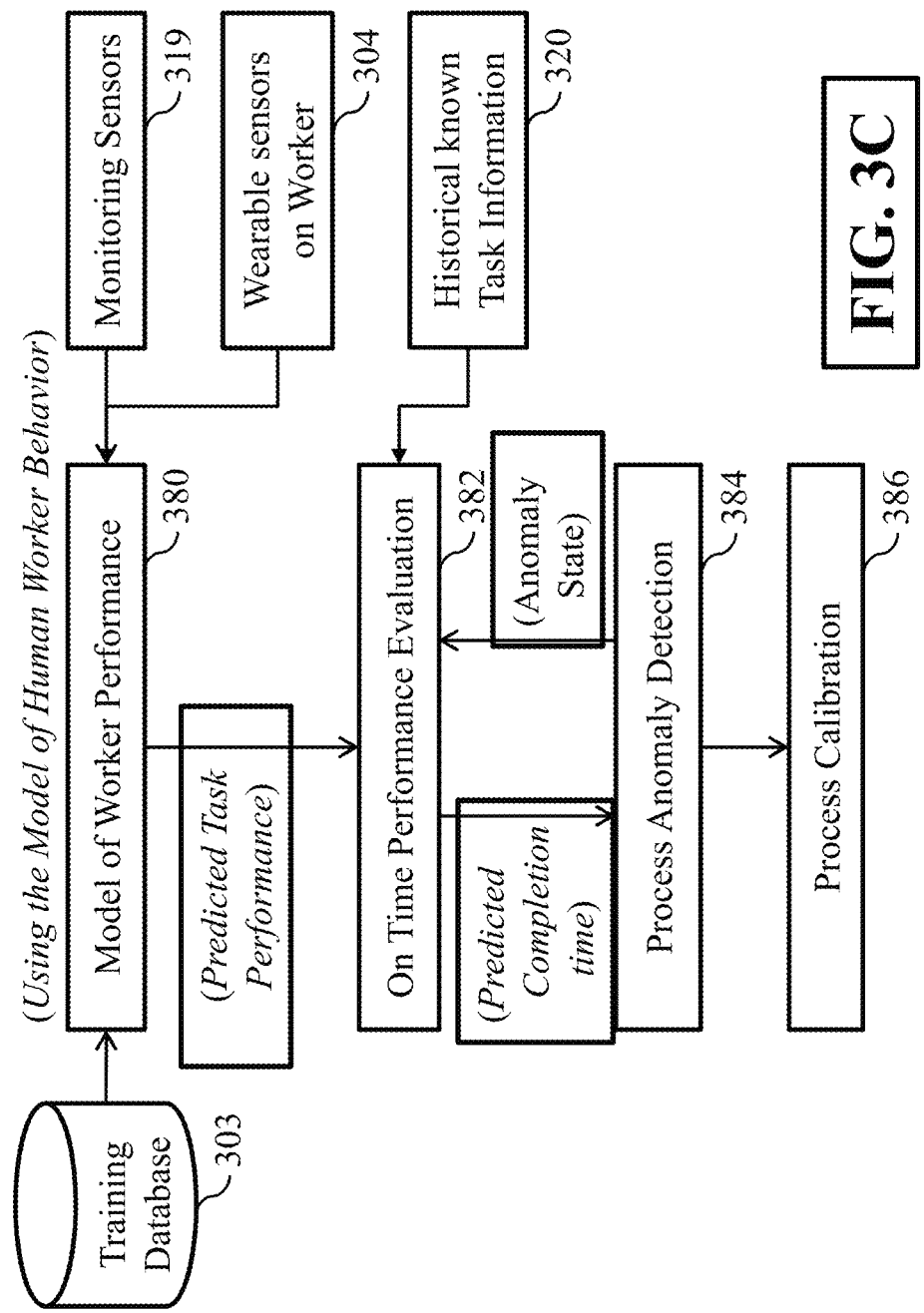
FIG. 3C is a block diagram illustrating some learning process steps of a model of human worker performance, and then doing process calibration for the model of human worker performance, according to some embodiments of the present disclosure.

FIG. 3C is a block diagram illustrating some learning process steps of a model of human worker performance 380, and then exploiting the model of human worker performance, according to an embodiment of the present disclosure. The model of human worker performance 380 is learned via machine learning methods that capture a description of the worker performance in a statistical model. Wherein two types of models can be used, (1) predictive models and (2) classification models.

Step 1 of FIG. 3C can be a learning process step for learning the model of human worker performance 380 by accessing the training database 303 that was collected using the approach shown in FIG. 3B. Wherein the training database 303 can be used to learn both a predictive model and a classification model of the model of human worker performance 380. The predictive models can be used to effectively learn via training data in the training database 303, operational methods performed by humans to learn expected completion times for different sub-tasks in the series of task, and to effectively capture patterns observed in sensor data that indicate how workers perform tasks in the series of tasks. The predictive models can be trained using historical (past) worker data (i.e. collected prior to collecting current worker data). However, contemplated is that other workers having a similar profile as the worker being assessed, such training data may be collected. Some aspects of a similar profile of other workers can include all of the data obtained about the worker, including years of experience, age, education, physical body characteristics, health condition rating, etc., by non-limiting example. Some collected task information can include task label (assembly, inspection, paint, stitch, etc.), expected task duration (typical duration, specified duration, etc.) and worker skill level (can be expressed in years of employment). Together these features are recorded in the training database 303 and used to assist in learning the model of the human performance. There are many types of predictive algorithms. For simplicity, we describe a linear regression predictive model. A linear regression model assumes a linear dependency between the outputs and the inputs: the inputs also called regressors are multiplied by a set of parameters and then summed up to estimate the output. As an example, suppose we have collected one multidimensional regressor point $X=[x1, x2, x3, \ldots, xN]$ where each xi with $\{i=1, \ldots, N\}$ represents one of the described variables such as worker heart rate, worker motion in the x,y, or z direction, room temperature etc. Then suppose that we have estimated a set of parameters, $A=[a1, a2, \ldots, aN]$, through machine learning or system identification techniques to predict the completion time of the current task, tc. Then in this case, the completion time can be predicted as f(X) which is determined as $\hat{tc}=\hat{f}(X)=a1x1+a2x2+\ldots+aNxN$.

Still referring to Step 1 of FIG. 3C, the trained predictive models stored in the training database 303 can include levels of expected completion times for different tasks in the series of task, and patterns of how workers perform tasks in the series of tasks, in order to create thresholds relating to levels of performance that may be used to assist in anomaly detection The classification models can be used to learn the style of work performed by the human. Wherein the classification model, i.e. algorithm, can determine a current task that is performed by the worker and a next worker task, from training data stored in the training database 303. Examples of such algorithms include worker gaze detection algorithms that can determine if the user is focused on his/her on-going task. An example gaze detection algorithm learns a distribution of the worker gaze location (x, y coordinates) during the completion of a task. This distribution is assumed to be unique for each particular task. Then for a known task, the gaze of the worker can be input into this distribution and assigned a probability of belonging to the particular task. If the probability is low, the worker is may be fatigued, distracted, or simply taking a break.

Still referring to Step 1 of FIG. 3C, other methods of tracking worker performance can be built using measurements from inertial measurement sensors, biological sensors, external monitors in the environment, time information, and external motion sensors such as gaze detectors, that may be used to obtain such information as the worker state (ex. Energetic, tired, slow, etc.) or task performed (assembly, inspection, paint, stitch, etc.). As an example of a classification model, we use a Gaussian distribution. This distribution is parametrized using mean and variance. Specifically, we want to learn a Gaussian distribution of the worker Gaze. Here because worker Gaze is tracked in a plane, the learned distribution is 2 dimensional with a mean—$\mu$ and a covariance matrix of size 2×2, $\Sigma$. Model learning comprises of estimating the mean and the covariance matrix from stored gaze data. Then at every point x, y we can determine the value of the distribution, $f(x,y,|\mu, \Sigma)$. To classify if a worker is paying attention to the task, each new gaze location, $x_n$, $y_n$, is input into the distribution $f(x_n,y_n|\mu, \Sigma)$. A high probability point, p, means that the worker is working on the assigned task. A low probability means that the worker is distracted, tired, taking a break, or working on a different task. Used in this fashion the classification model determines if task completion is normal. However, this approach can also be used to distinguish between tasks. Suppose we have learned a distribution for each task. Then the distribution which yields the highest probability determines task belonging—i.e. classification of the ongoing task.

The trained classification models stored in the training database 303 can include levels of health/alertness of the human workers, in order to create thresholds relating levels of health of workers that may be used to assist in anomaly detection. For example, using the example above, different distributions could be learned for alertness levels of the worker. Here a healthy alert worker might have a narrow Gaussian distribution while a tired worker might have a broad Gaussian distribution. For a known task, comparing these different distributions reveals the alertness level of the worker. For a single distribution, it might be possible to track the change in the covariance matrix $\Sigma$ to determine changes in the worker. In general, worker health either can be explicitly tracked using levels of health, or implicitly tracked by studying the changes in predictions/classifications of the known models.

Still referring to Step 1 of FIG. 3C, once the model of human worker performance or performance model 380 is learned, the performance model 380 is continually updated in order to learn good human worker performance. For example, the performance model is updated when peak performance is observed by the worker. Here peak performance is interpreted in context of the desired application, for example in the scene depicted in FIG. 1C the worker and the robot are collaboratively working on an assembly line. Here peak performance might be the desired products per hour, the desired faulty rate per hour, or a combination thereof. When these conditions are met, the data collected in essence describes method, actions, and state of the worker that produces the desired peak performance. Noted, is that the worker is assumed capable of achieving the target performance rate. This approach will let the performance model 380 develop precise models of good performance and thus precise detection of deteriorating performance. At least one aspect of understanding the typical performance and state of the worker can be that the collaboration between a robot and a human itself may be in identifying changes in robot actions or human worker action, that further improve performance, i.e. for robot, human worker, task completion time, improve an overall speed and quality of the assembly line or product produced. Wherein the "typical (normal) performance" is defined as meeting a desired product output or fault rate threshold as per the example above. An example of adjusting robot performance to the human state, thereby linking the model of human performance to the robot task learning, is adjusting robot speed according to the human state. Here the robot has learned a set of rules that map the human state to a speed. For example, suppose the robot has learned that an energetic worker performs the task at speed A, a tired worked performs the task at speed 0.1A and a sick worker performs the task at speed 0.5A. Then, in real time using the prediction algorithms, the robot can choose which speed to select given the determined worker state. Noted, is that the robot can move in any direction, speed, etc. to adapt to human performance current data per task.

Step 2 of FIG. 3C describes this learning of the peak performance of the worker. Here data is continuously collected from the monitoring sensors 319, the wearable sensors 304, and the known task information 320. In addition to this data, there is an available database 303 of prior data that was collected from this worker. When the observed worker performance as desired in the particular application reaches the target performance, then the data is saved to the training database. Similar databases can be created for other conditions of the worker such as tired, sick, unhappy, etc. The data from this (these) database(s) 303 is then used to find the classification and predictions models discussed earlier. The collection of this data is very important because it provides the context needed for anomaly detection and process monitoring which will be described in the upcoming steps.

Step 3 of FIG. 3C can be thought of as the exploitation of the statistical models learned in Step 1 above. Here the classification model can be used for immediate anomaly detection 384, which can detect quickly if a worker's performance is deviating from normal. In addition, as discussed the changes in the classification model can be used to observe deterioration in the worker before a real anomaly is detected. The prediction model can be used to determine when the worker will complete his/her current task. In addition to providing an anomaly detection 384 capability, this also facilitates anomaly detection in the entire process. This is because this information can be used to generate a sequence of events that will happen from this point forward using event transition tables. The anomaly detection 384 and process calibration 386 are then part of Step 4 of the process.

Step 4 of FIG. 3C can be thought of as the model exploitation step. Here we leverage the models learned 380 using the stored data 303 and the currently collected data 304, 319, 320. Many anomaly detection mechanisms can be constructed using this experimental setup. One example is directly using the completion time prediction model to determine if a worker is performing well or anomalously. A more complex example is using the completion time in an event transition table and generating sequences of possible manufacturing actions given the predicted task completion time. In each case, the models can directly send an alarm about an immediate anomaly. However, a subtle realization is that the anomaly models can also be used for process calibration 386. For example, if the Gaussian method of gaze detection describe above is showing a growing covariance in the gaze plane, it may be possible to change the manufacturing process to improve speed and quality. For example, a robot could be trained to slow its actions to match the worker actions thereby reducing errors. Alternatively, a robot could be trained to bring the parts closer to the worker to improve focus. Overall, the series of manufacturing events might be rerouted such that other workers replace some of the load observed by the current worker. This means that the statistical models monitoring the worker can also be used to improve the human-robot manufacturing process adaptively with respect to the worker condition.

Figure 4A:
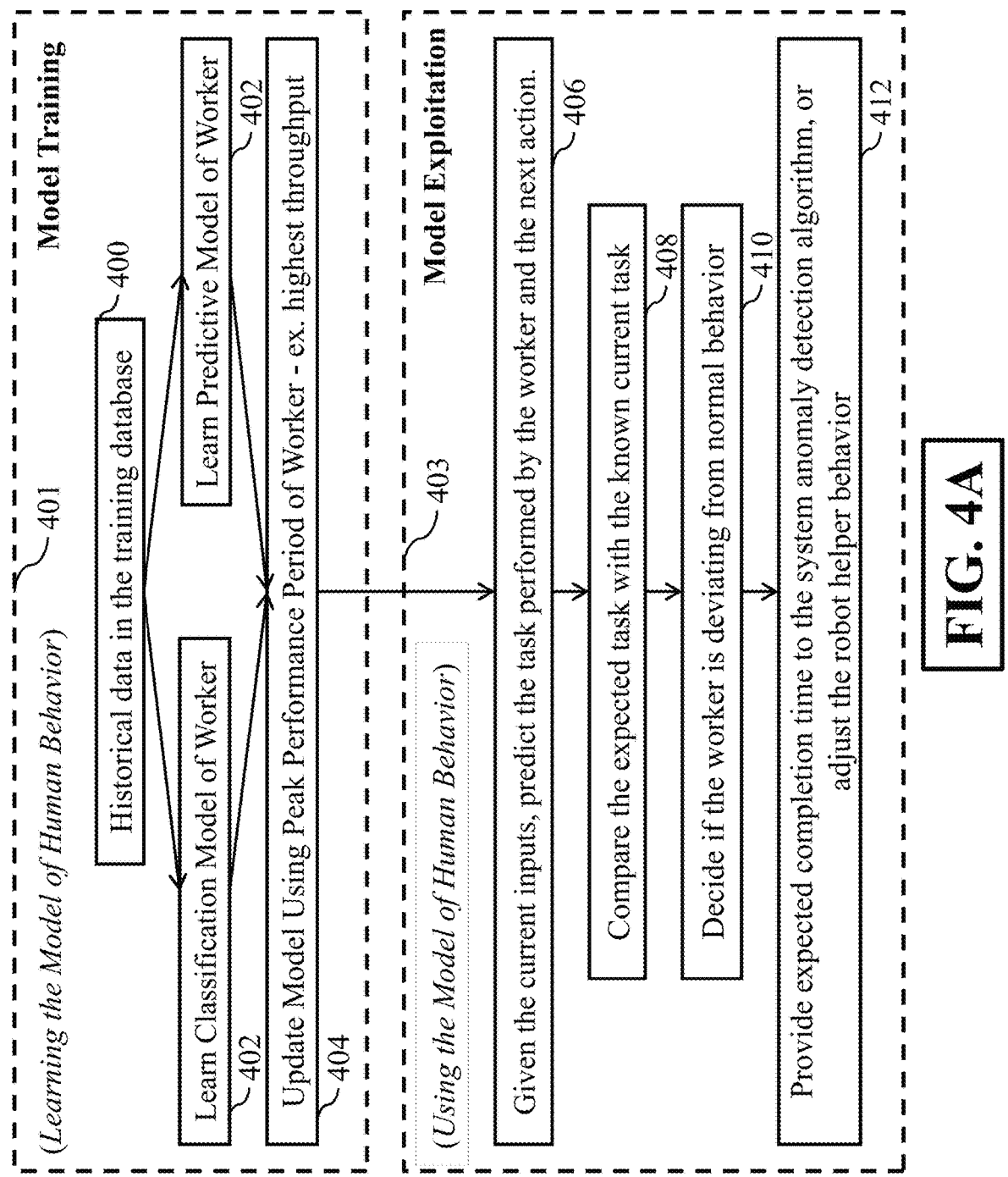
FIG. 4A is a block diagram illustrating some process steps of a model of human worker performance, and then exploiting the model of human worker performance, according to some embodiments of the present disclosure.

FIG. 4A is a block diagram illustrating some process steps of a model of human worker performance, and then exploiting the model of human worker performance, according to some embodiments of the present disclosure. This figure specifically describes this learning of the peak performance of the worker. Here there is an available database 400 of prior data that was collected from this worker. The stored data, because of its method of collection specifically captures the performance of a worker when they are performing well. Separately, data could also be annotated for other conditions of the worker such as tired, sick, unhappy, etc. The data from this database 400 is then used to find the classification and predictions models. These models are determined in Steps 402 and 402 and can be thought of as the prediction and classification models previously described. The models can then be updated when the corresponding worker condition is detected and new data is collected 404 (as previously described).

Figure 4B:
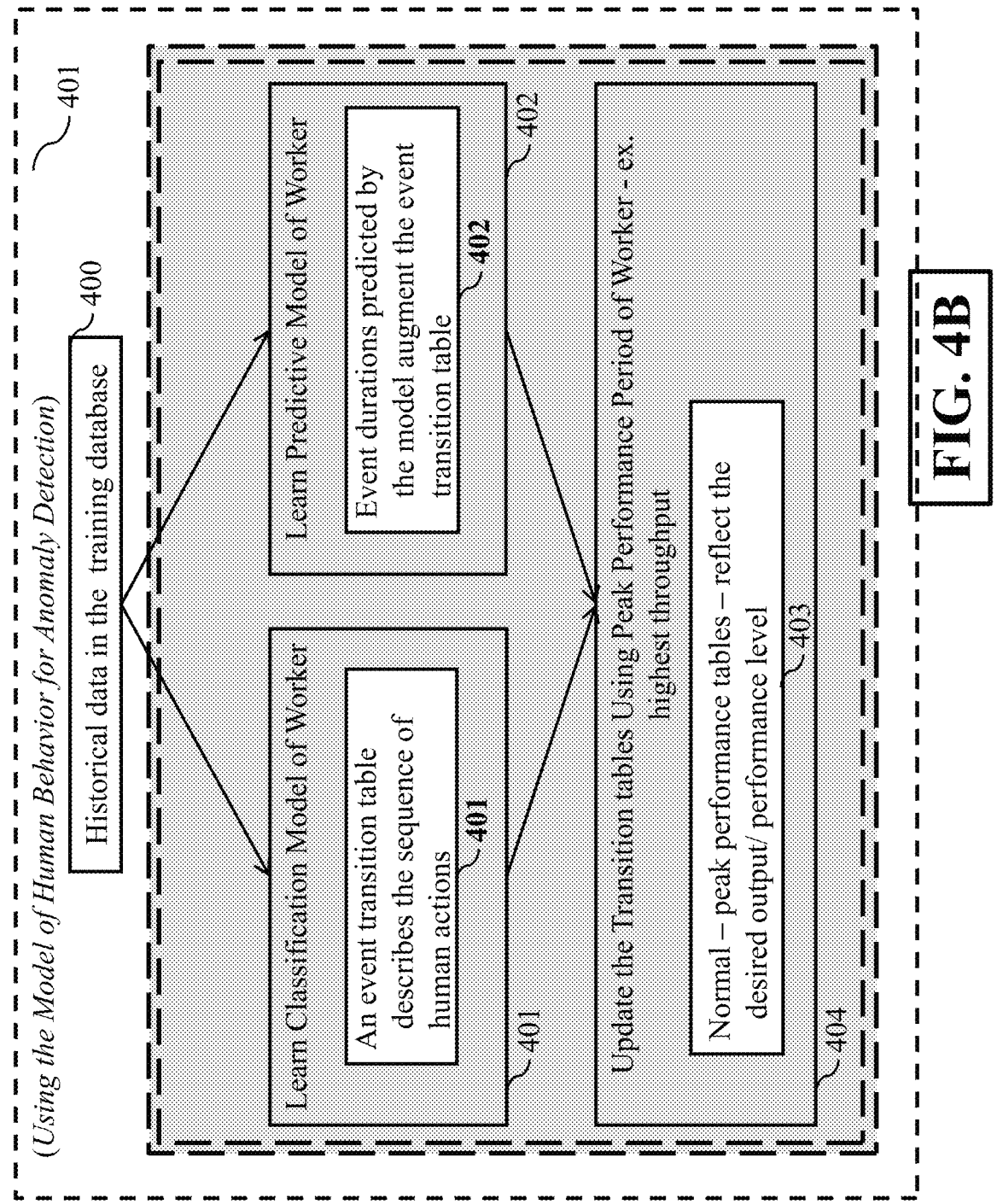
FIG. 4B is a block diagram illustrating some learning process steps of the model of human worker performance of FIG. 4A, and then some process steps for exploiting the model of human worker performance of FIG. 4A, according to some embodiments of the present disclosure.

FIG. 4B is a block diagram illustrating some steps of using the learned model of human worker performance of FIG. 4A in event transition tables. These tables describe the normal sequence of events in the overall human-robot manufacturing process and are a computationally efficient method of anomaly detection. In FIG. 4B, the historical database 400 is used to train classification 401 and prediction 402 models. The classification model can then be used to learn the event transition table because it predicts the event, which is currently taking place. In essence, the model helps to detect the transition of the worker from one task to the next. The prediction model can be used to augment the event transition tables by learning a distribution of the task completion times. The event transition table can be updated in a similar fashion to models based on application specific conditions. For example, if a worker has achieved the desired product output at a desired fault rate, the typical sequences of manufacture can be created and the event transition table updated. Transition tables can also be created for different worker states.

Figure 5A:
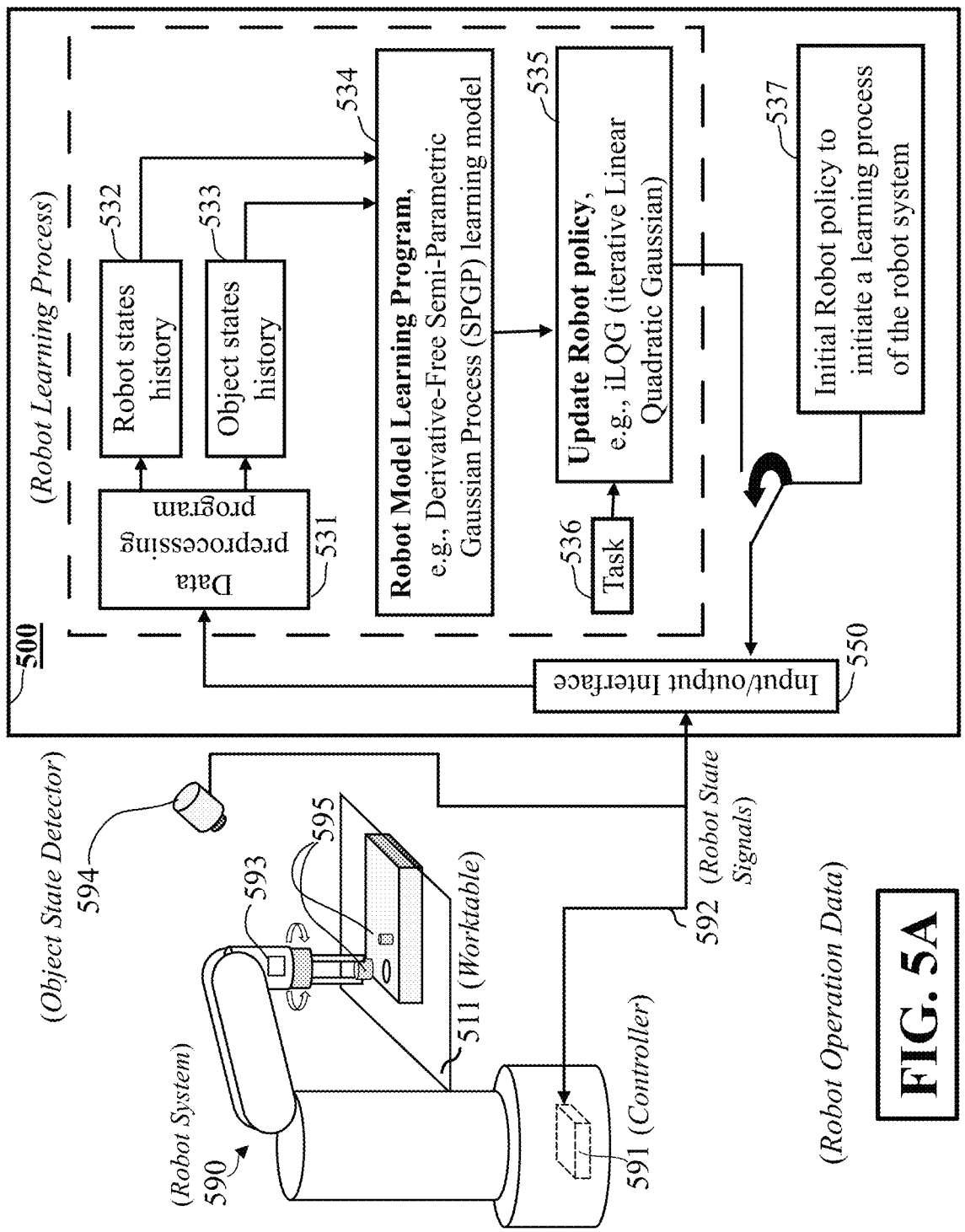
FIG. 5A is a schematic diagram illustrating a robot learning-control apparatus including a Robot Model Learning Program, e.g., Derivative-Free Semi-Parametric Gaussian Process (SPGP) learning model, connected to a robotic system, according to some embodiments of the present disclosure.

FIG. 5A is a schematic diagram illustrating a robot learning-control apparatus including Robot Model Learning Program, e.g., Derivative-Free Semi-Parametric Gaussian Process (SPGP) learning model, connected to a robotic system, according to some embodiments of the present disclosure. The robot learning is also an integral part of the present disclosure, which made possible by a learning system for a robot. Contemplated is that other systems can be used such as different types of controllers from different types of a machine learning state of the art approaches using other Model Based Reinforcement Learning techniques, or even from classical control state of the art approaches where the model is learned from data using, for example, Gaussian Processes or Neural Networks, where a control law could be given for example by a Model Predictive Control, by non-limiting example, according to some embodiments of the present disclosure. The components 590, 591, 595 and the worktable 511 define an example of an application to which some of the embodiments of the present disclosure can be applied.

Continuing with the robot learning system of FIG. 5A, a robot learning-control apparatus 500 is used for controlling a robot system, and transmits to the robot controller 591 via interface 550, an initialized and updated robot policy. The robot controller 591 implements the initialized and updated robot policy to execute the task on the object 595. Further, robot state signals 592 of the robot system 590 detected by at least one robot state detector, i.e. a positional encoder 593, object state signals of the object 595 detected by the object state detector, and the initialized robot policy are sent to the Data preprocessing program 531, where the signals are preprocessed and stored in memory as robot states history 532 and object states history 533. Contemplated is that the object state signals can be detected by at least one object detector for example a camera 594. These components 590, 591, 595, 594, 593 are here represented as an example but they may vary depending upon the specific user application or different task related applications, according to some embodiments of the present disclosure.

Still referring to FIG. 5A, in the beginning of the learning (training) process an initial robot policy 537 may move the robot in an exploratory fashion for a predetermined period of time be sent to the robot system 590 using the interface 550. The initial robot policy is an arbitrary signal, which could be for example a sinusoidal signal, a sum of sinusoids or a random signal. During the predetermined period of time, the data collected are the object state and the robot system state detected by 594 and 593, respectively, that the input/output interface 550 sends to the data-preprocessing program 531. In the data-preprocessing program 531, the data are subject to some preprocessing, then then stored in a memory as the robot state history 532 and as the object state history 533, these quantities at each time step contain a finite history of the past positions of the robot and of the object, respectively.

The Robot Model-learning program 534, can be for example the Derivative-free SPGP (DF-SPGP) which takes as an input the robot states history 532, the object states history 533 and the initial robot policy. In performing the DF-SPGP Model learning program 534, the Derivative-free SPGP (DF-SPGP) kernel learning program (not shown) and the Derivative-free SPGP Model learning program are trained. The Derivative-free SPGP model obtained in 534 together with the task specification 536 of the task that the robot has to compute on the objects 595 are used to compute the updated robot policy in 535. In 535, the robot policy can be for example, the Iterative Linear Quadratic Gaussian (iLQG), but it could be replaced with any trajectory optimization technique model-based. Once the updated robot policy is learned in 535 this can be sent to the robot system via the input/output interface 550 and the controller 591. The robot system 590 performs now the task on the object 595. The Derivative-free SPGP (DF-SPGP) Model-learning program in 534 and the policy algorithm Iterative Linear Quadratic Gaussian (iLQG) in 535 are only an example that has been shown to be successful for robot manipulation. Accordingly, to some embodiments of the present disclosure, the model-learning program 534 and the policy computation 535 are not restricted to be the one illustrated here. The model 534 could be for example a standard Gaussian process, a deep neural network or any other function approximators for the forward dynamics. The policy 535 could also be any other model-based controller such as Model Predictive Control. The component 534 and 535 could also be combined together to determine a policy without a specific model, using therefor model-free policy algorithms such as PID controllers or model-free reinforcement learning algorithms.

Figure 5B:
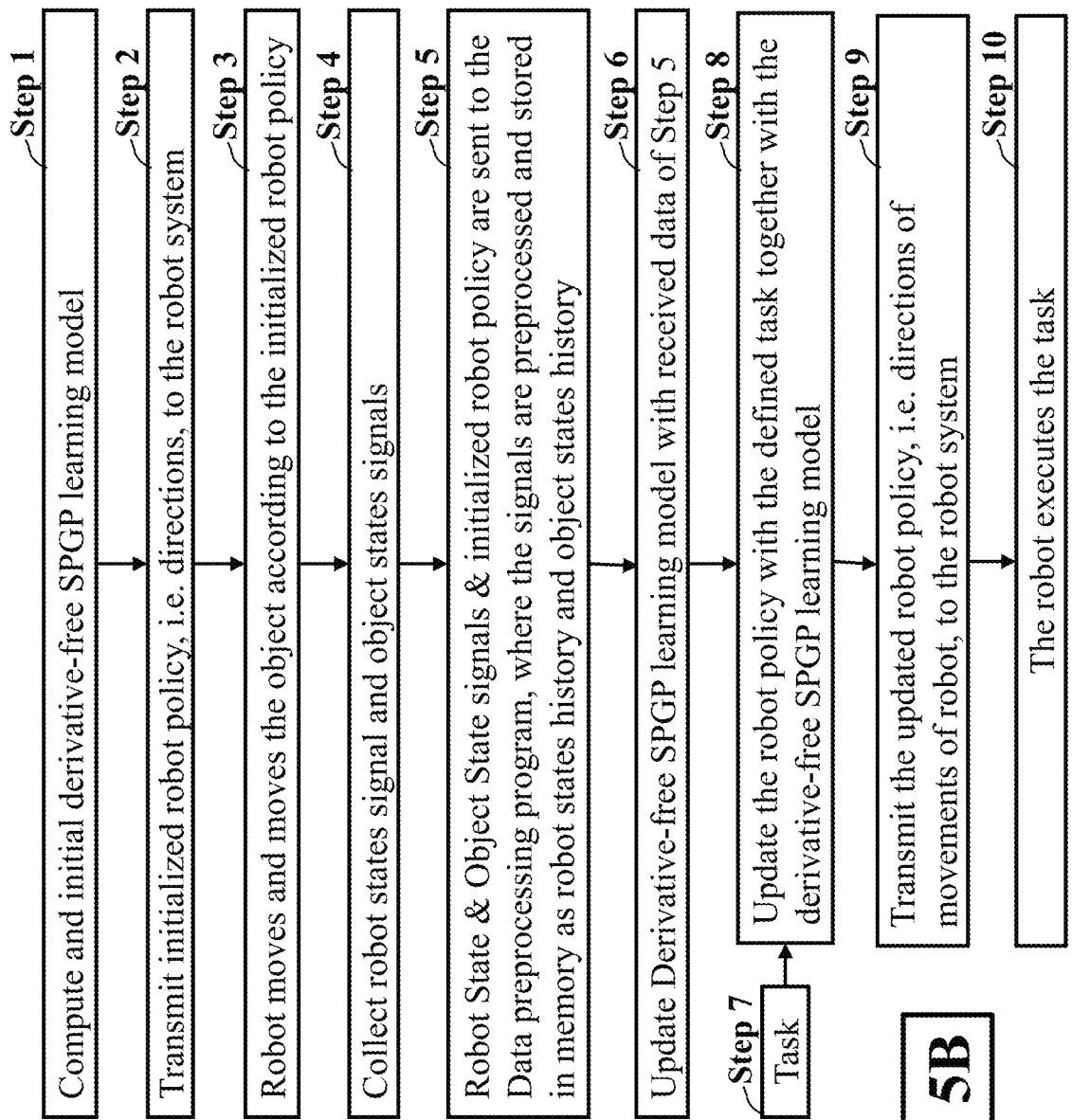
FIG. 5B is a block diagram illustrating a flowchart describing the robot model learning program, i.e. a derivative-free Semi-Parametric Gaussian Process (SPGP) learning model of FIG. 5A, that initiates the robot policy to start the learning process of the robot system for a predetermined period of time, according to some embodiments of the present disclosure.

FIG. 5B is a block diagram illustrating a flowchart describing the robot model learning program, i.e. a derivative-free Semi-Parametric Gaussian Process (SPGP) learning model of FIG. 5A, that initiates the robot policy to start the learning process of the robot system for a predetermined period of time, according to embodiments of the present disclosure.

Referring to FIG. 5B and FIG. 5A, step 1 of FIG. 5B computes and initializes the robot policy to initiate the learning process of the robot system. Step 2 of FIG. 5B transmits the initialized robot policy via a control signal to the robot system (590 of FIG. 5A), via the interface 550 of FIG. 5A, which sends the control signal to the controller 591 of FIG. 5A, which makes the robot system 590 of FIG. 5A move accordingly to the initialized robot policy in the next step (step 3). Step 3 of FIG. 5B receives the control signal which is used by the robot system 590 of FIG. 5A to manipulate the object 595 of FIG. 5A for the predetermined period of time. Step 4 of FIG. 5B collects the robot states signal 592 of FIG. 5A and the object states signals from the object state-detector 594 of FIG. 5A and sends the signals to the robot learning-control apparatus 500 of FIG. 5A via the interface 550 of FIG. 5A. Step 5 of FIG. 5B receives and sends the signals along with the initialized robot policy to the Data preprocessing program 531 of FIG. 5A, where the data are preprocessed and stored in memory as robot states history 532 of FIG. 5A and object states history 533 of FIG. 5A. Step 6 of FIG. 5B updates the Derivative-free SPGP learning model 534 of FIG. 5A with the received data of the previous step (step 5). Step 7 of FIG. 5B defines a task 536 of FIG. 5A that the robot system should compute on the manipulated object 595 of FIG. 5A. Step 8 of FIG. 5B uses the defined task together with the derivative-free SPGP learning model to update the robot policy using iLQG 535 of FIG. 5A. Step 9 of FIG. 5B the updated robot policy is then transmitted to the robot system 590 of FIG. 5A using the interface 550 of FIG. 5A that is connected to the controller of 591 FIG. 5A. Step 10 of FIG. 5B executes the updated robot policy via robot system 590 of FIG. 5A which performs the task manipulating of the object 594 of FIG. 5A accordingly to the updated policy 535 of FIG. 5A obtained using the Derivative-free SPGP learning model 534 of FIG. 5A.

Referring to FIG. 5A, according to aspects of the present disclosure a model learning system (as for example the derivative-free model learning program described above) can be arranged in a robot learning-control apparatus that can be arranged within the process control system 100 of FIG. 1B, or arranged as a separate unit that can include at least the components of the process control systems of FIG. 1B, according to embodiments of the present disclosure. The robot learning-control apparatus can be used for controlling the robot system 590 and configured to transmit an initial and updated policy program to the robot system 590, via interface 550. Wherein the robot state signals 592 of the robot system 590 and object state signals are received with respect to the object 595 to be manipulated by the robot system 590 on a worktable 511. The object state signals are detected by at least one object detector 594, and the memory 140 of FIG. 1B can store computer-executable programs in the storage 130 of FIG. 1B including a data preprocess program 131, object state history data 133, robot state history data 132, a statistical model learning program 134, an update-policy program 135, an initial policy program 137, a robot states history 132 and an object states history 133, and a processor 120 (or more than one processor), in connection with the memory 140 of FIG. 1B. The processor 120 of FIG. 1B is configured to transmit the initial policy program 137 of FIG. 1B to the robot system 195 of FIG. 1B via a network 57 for initiating a learning process that operates the robot system manipulating the object while a preset period of time. In this case, a processor can update the Model learning program 534 according to the object state history data and the robot state history data converted, using the data preprocess program 531, from sets of the robot state and object state signals having received in the preset period of time, wherein the processor updates the update-policy program 535 according to the updated Model learning program 534.

Combining the Robot Learning with Human Performance Monitoring

FIG. 6A is a schematic diagram illustrating interaction between the robot and the human during the human-robot manufacturing process, according to some embodiments of the present disclosure. To learn this interaction statistical models are used and are based on machine learning capable of making inferences and reacting to the ongoing interaction between the robot and the human operator. To learn these models, we collect data from built-in sensors on the robots from external sensors like cameras. The external sensors can be the same sensors previously used to learn the characterization of the human collaborator, for example, or other external sensors located in proximity to the robot system. Wherein the learned model can be a combined representation of the robot and of the human collaborator. At a conceptual level, this learned model could be as the addition of adding features that represent the human collaborator and the robot during the learning process, or learning individual representations separately, and then later combining these into a global model.

Still referring to FIG. 6A, specifically, as an illustrative example, we take the case of where the robot model is learned jointly on the robot state and action space and on the human state and action space. The robot model is learned during a training phase. The training phase might consist on a first phase that gathers human data, such as a worker or a population of workers that can be observed by external sensors (ex. one or more cameras) and other sensors. With this human data, a predictive model can be learned to infer quantities like predicted completion time or predicted worker movements and a classification model to infer a state of the worker(s) and the task on which the worker is currently working. Then second, we initialize a control law or policy that provides the robot to perform reasonably well in the operations the robot has to accomplish to help the worker. An expert engineer can do this, by kinesthetic teaching or through simulation via machine learning techniques such as reinforcement learning. The final stage of training can consist of training a global model that is defined on the state space including the state space of the robot and of the human. The policy of the robot is now adaptively improved accordingly to this learning model as the worker and the robot work together to accomplish the task. These adaptive online machine-learning techniques can be used to update the learning model and the robot policy as data is collected from the built-in sensors of the robot and human worker. In this way, the robot will not only perfect the robot's own policy, but will also be able to adapt to different situations in which the state of the worker changes. The robot should be a co-bot and/or controlled in compliance mode in order to guarantee the safety of the worker.

The resulting joint model of robot/human can be very different for different states of the human. This is illustrated in FIG. 6A, and by necessity this figure is two-dimensional, but it can be logically extended to any number of dimensions. Here the robot only has one possible action speed up or slow down. The human has only two possible states tired or energetic. The robot must learn that when the human is energetic it can have a faster speed and when the human is tired it can have a slower speed. When the statistical models are learned the robot will learn that there is a higher cost to fast action if the worker is tired, and an optimal cost to lower speed. The same is true in reverse if the worker is energetic. FIG. 6A also demonstrates the need for human performance models. It is certainly true that this same principle could be accomplished by directly feeding human measurements to the robot. However, this would cause the state space of the robot to become much large adding noise and computational complexity to the problem. Thus, it is advantageous to first learn a model of the human state evolution and include this in the combined human/robot model.

FIG. 6B, FIG. 6C and FIG. 6D, illustrate multiple methods of developing the joint human-robot model, wherein three possible training approaches can yield the combined human-robot model described conceptually above, i.e. FIG. 6B, 601B; FIG. 6C, 608C; and FIG. 6D, 609D.

FIG. 6B illustrates the first approach 601B that focuses on combining the human model 604B and the robot model 607B into a joint model 605B. This model uses its corresponding data, human data 602B and a training phase 603B and robot data 606B and a training phase 611B that is unique to the given data set. The resulting model 605B relies on the output of both previously learned models 604B and 607B. This approach can be a direct method of combining these models. A policy for the robot based on the robot model 607B and on the task 617B, the robot has to achieve, e.g., help the human worker in the assembly line task, is computed. The policy can be achieved with any policy optimization algorithm 612B, with model based reinforcement learning or optimal control as described above. When, the joint human-robot model 605B is computed, this can be used to improve the robot policy 612B, that can be updated considering not only the robot model 607B and the task 617B, but also having information of the human model 604B, in order to have new robot policy 612B.

FIG. 6C is a block diagram illustrating combining the human model and the robot model into a joint model, which includes training the human model using data collected from the human worker, according to some embodiments of the present disclosure. This second approach 608C to combining these models begins by training 603C a human model 604C using data collected from the human worker 602C. The human model 604C is then used with the robot data 606C during training 611C of the joint model 605C. When, the joint human-robot model 605C is computed, this can be used to learn a new robot policy 612C. At least one advantage of this second approach is that we are learning a unified model whose input features include the model learned about the human worker.

FIG. 6D is a block diagram illustrating learning an individual model for both the human and robot, then learns a joint model that is used to improve the robot policy and finally, this robot policy can be used during the operations, such that while the robot and the human are operating, data can be collected, so that the robot model and the robot policy are continuously updated using the collected data, according to some embodiments of the present disclosure. The third approach 609D begins similarly to the first approach 601B. Here a human model 604D and a robot model 607D are combined into a joint model 605D. Each model uses its corresponding data, human data 602D and a training phase 603D and robot data 606D and a training phase 611D that is unique to the given data set. The resulting model 605D relies on the output of both previously learned models 604D and 607D. This model is used to learn a first robot policy 612D. As a difference with the first approach in 601B, the robot model 607D and the robot policy 612D are updated online. While the human is co-working with the robot, which is controlled under the robot policy 612D, data from both the human and the robot are collected in 619D. The data are the same as described in some embodiments of the present disclosure above. These data are then used online to improve the robot model 607D and the robot policy 612D. The updated robot model and robot policy can be thought of as corrections to the initial robot model 607D and to the initial robot policy 612D that are used with the original robot model 607D to ensure proper robot operation.

In all cases, the learned joint model can then be used to determine a control method of the robot, which is capable of interacting with the collaborator during his/her physical states (Energized, tired, slow, etc.) uniquely, represented by his/her measurements. Importantly, this collaboration is learned with the goal of completing the human-robot manufacturing task and maximizing product quality. Because collecting data in this setting may be time consuming, and because the robot in this system is an engineered device. The models learned here can also incorporate physical knowledge e.g., equations of motion of the robot, characteristics of the human operator and possibly task dependent features as prior information to the machine learning algorithm.

Figure 7A:
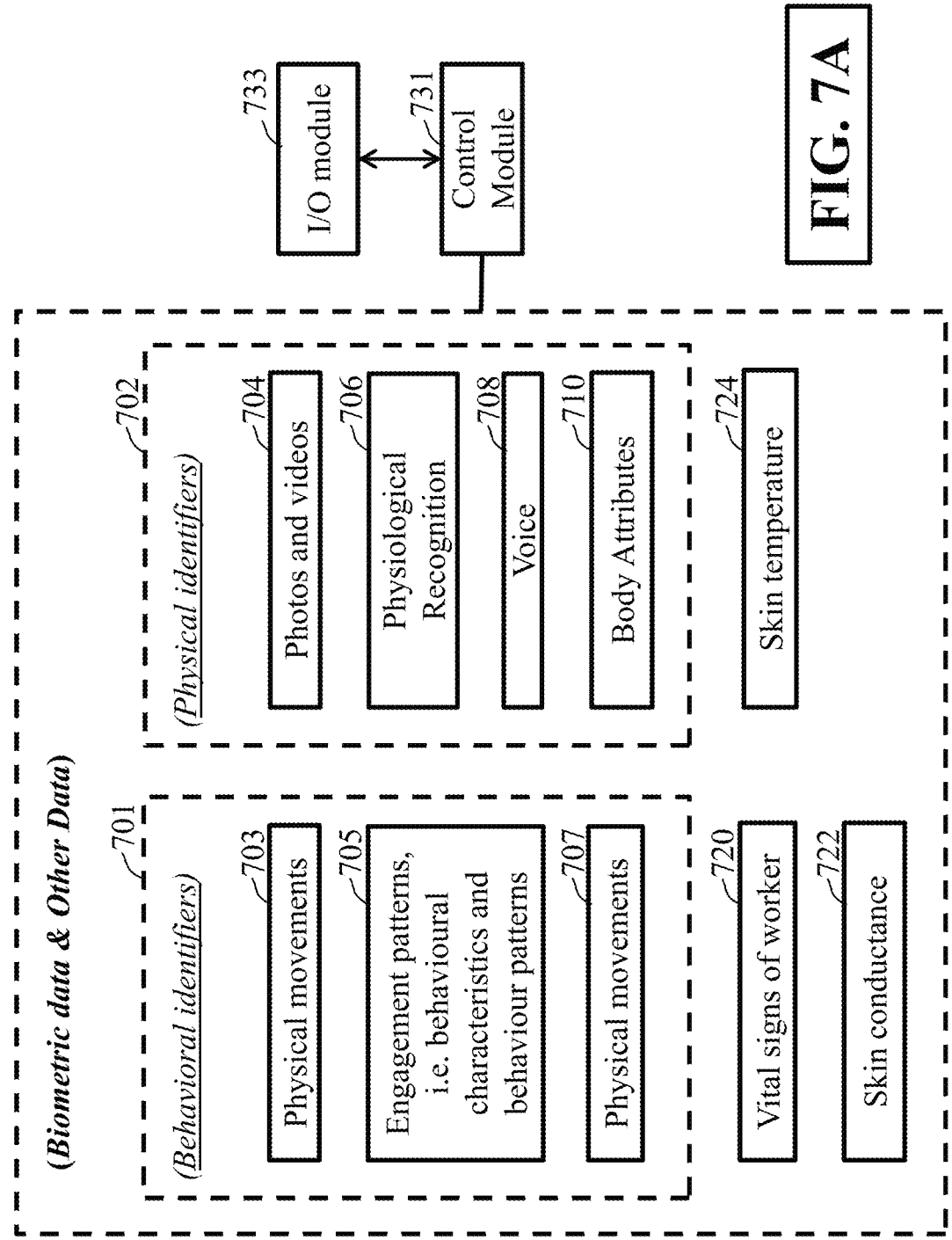
FIG. 7A is a block diagram illustrating some sensing data including biometric and other data that can be collected and be used in assisting the process control system in detecting anomalies, according to some embodiments of the present disclosure.

FIG. 7A is a block diagram illustrating some sensing data including biometric and other data that can be collected and be used in assisting the process control system in detecting anomalies, according to some embodiments of the present disclosure. For example, some biometric data can include behavioral identifiers 701 that may include physical movements 703, engagement patterns 705 such as behavioral characteristics and behavior patterns, physical movements 707. Some other biometric data can include physical identifiers 702 that may include photo & videos 704, physiological recognition 706, voice 708 and body attributes 710. Other data that can be collected can include vital signs of the worker 720, skin conductance 722 and skin temperature. The biometric data sensing may include an I/O module, which can include wireless communication components or an on-device user interface, control module, a power supply that may be a removable or rechargeable battery. The biometric data sensing may include one or more sensors that measure heart rate, vital signs of the worker 720, skin temperature 724, and/or skin conductance 722. The one or more sensors are located at the vicinity of the worker. A heart rate monitor or a heart rate sensor may measure the heart rate of the worker. The heart rate sensor should have accuracy sufficient to differentiate between the LF band and the HF band. Further, based on the heart rate measurements, a processor module can be used to determine a ratio of low spectral frequency (LF) heart rate variability to high spectral frequency (HF) heart rate variability. A higher ratio of LF to HF corresponds to a higher level of discomfort for the worker. The vital signs of worker 720 may be obtained by utilizing a remote photo plethysmography (RPPG) sensor. In some embodiments, a wearable device may be used for measuring the vital signs of the worker, wherein during an operation of the process control system, the wearable device can be in remote communication with the input interface of the process control system.

Figure 7B:
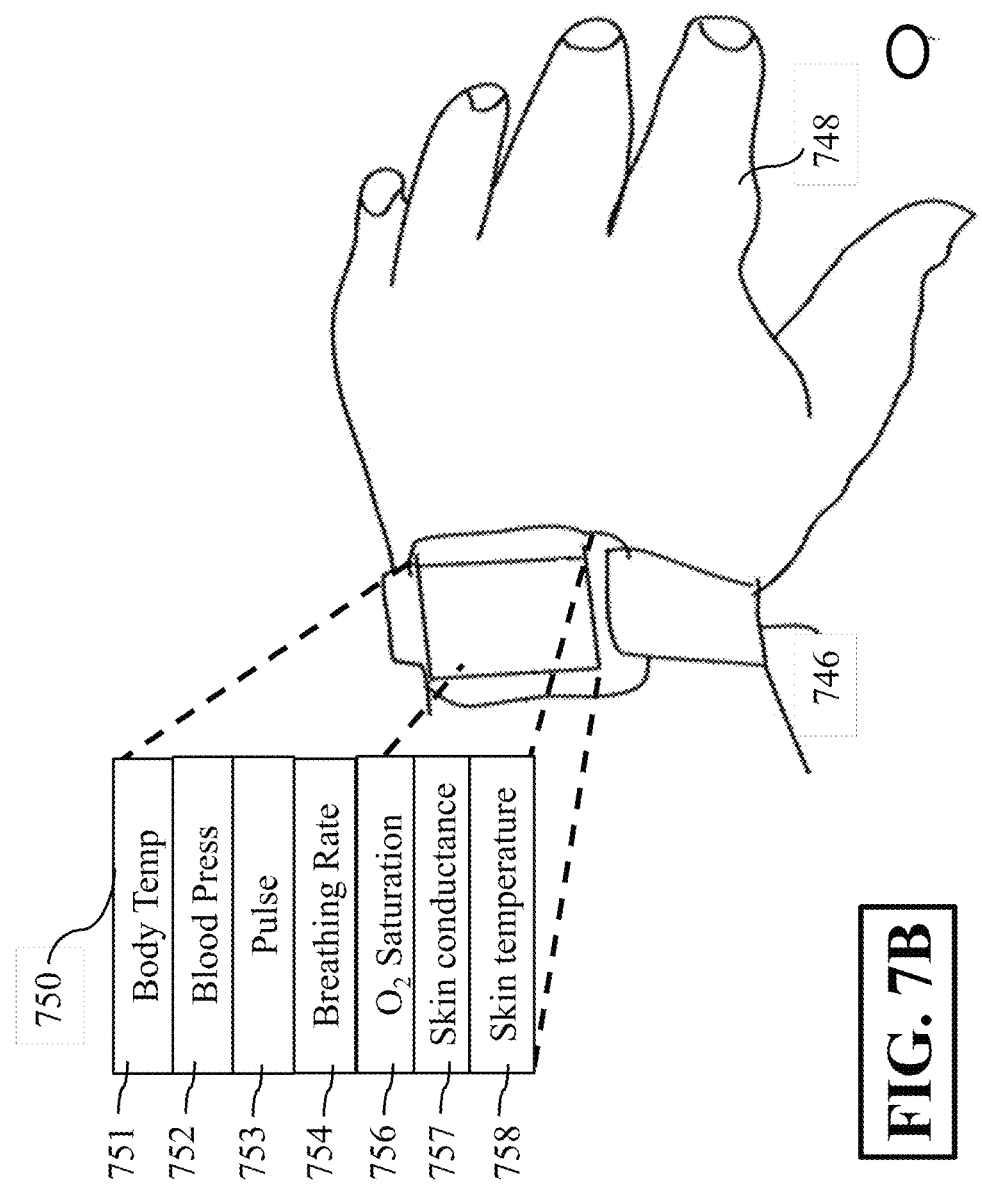
FIG. 7B is a schematic illustrating a wrist device, according to some embodiments of the present disclosure.

Still referring to FIG. 7A and FIG. 7B, FIG. 7A shows the skin conductance 722 may be measured as the galvanic skin response reflecting the change in electrical properties of the worker's skin associated with evaporative transfer from the worker's skin. The skin temperature 724 may be used to quantify the heat transfer between the worker and the environment. Each of the skin conductance and the skin temperature measurements may be compared to respective predefined ranges indicative of a particular worker's preference. The biometric data sensing may include an IR camera that outputs IR image of the worker. Analysis of the IR image may provide an estimate of clothing level by comparing temperature of the outer most layer of clothing to the skin temperature of the worker. To obtain the biometric data one or more sensors may be in direct contact with the skin of the worker. For example, the sensing may be a wearable device, such as a watch, bracelet, necklace, shoe insert, or armband. FIG. 7B is a schematic illustrating an example of a wearable wrist device, according to some embodiments of the present disclosure. The wearable device 746 may be disposed on wrist of the worker 748. The wearable device 746 can be configured to display a list 750 as well as obtain data for each item in the list 750. For example, such display and data obtained in the list 750 can include body temperature 751, blood pressure 752, pulse rate 753, breathing rate 754, 02 saturation 756, skin conductance 757 and skin temperature 758.

Model Based Reinforcement Learning Using Gaussian Process Regression

Here we describe the standard model-learning framework using Gaussian Process Regression (GPR) and a trajectory optimization algorithm adopted in Model Based Reinforcement Learning MBRL. This is to give a technical explanation of how the statistical model learning 134 of FIG. 1B, the Control Program 135 of FIG. 1B, the model learning 534 of FIG. 5A, the Update Policy 535 of FIG. 5A can be computed.

A Markov Decision Process (MDP) formally defines an environment for RL. Consider a discrete-time system $\tilde{x}_{k+1}=f(\tilde{x}_k, u_k)$ subject to the Markov property, where $\tilde{x}_k \in R^{n_s}$ and $u_k \in R^{n_u}$ are the state vector and the input vector at the time instant k. When considering a mechanical system with generalized coordinates $q_k = [q_k^1, \ldots, q_k^n] \in R^n$, the dynamics equations obtained through Rigid Body Dynamics, suggest that, in order to satisfy the Markov property, the state vector $\tilde{x}$ should consist of positions, velocities, and accelerations of the generalized coordinates, i.e. $\tilde{x}_k = [q_k, \dot{q}_k, \ddot{q}_k] \in R^{3n}$, or possibly of a subset of these variables, depending on the task definition.

Model-based RL algorithms derive the policy $\pi(\tilde{x}_k)$ starting from $\hat{f}(\tilde{x}_k, u_k)$, an estimate of the system evolution.

Gaussian Process Regression: GPR can be used to learn $\hat{f}(\tilde{x}_k, u_k)$. Typically, the variables composing $\tilde{x}_{k+1}$ are assumed to be conditionally independent given $\tilde{x}_{k+1}$ and $u_k$, and each state dimension is modeled by a separate GPR. The components of $\hat{f}(\tilde{x}_k, u_k)$ denoted by $\hat{f}^i(\tilde{x}_k, u_k)$, with i=1 ... $n_s$, are inferred and updated based on $\{X, y^i\}$, a data set of input-output noisy observations. Let N be the number of samples available and define the set of GPR inputs as $X=[\tilde{x}_1, \ldots, \tilde{x}_N]$ where $\tilde{x}_k=[\tilde{x}_k, u_k] \in R^m$ with $m=n_s+n_u$. As regards the outputs $y^i=[y_1^i, \ldots, y_N^i]$, two definitions have been proposed in the literature. In particular, $y_k^i$ can be defined as $\tilde{x}_{k+1}^i$, the i-th component of the state at the next time instant, or as $y_k^i = \tilde{x}_{k+1}^i - \tilde{x}_k^i$, leading to $\hat{\tilde{x}}_{k+1} = \tilde{x}_k + \hat{f}(\tilde{x}_k, u_k)$. In both cases, GPR models the observations as $$y^i = \begin{bmatrix} f^i(x_1) \\ \vdots \\ f^i(x_N) \end{bmatrix} + \begin{bmatrix} e_1 \\ \vdots \\ e_N \end{bmatrix} = f^i(X) + e, \quad (1)$$

where e is Gaussian i.i.d. noise with zero mean and covariance $\sigma_n^2$, and $f^i(X): N(m_f^i(X), K_f^i(X, X))$. The matrix $K_f^i(X, X) \in R^{N \times N}$ is called the kernel matrix, and is defined through the kernel function $k_f^i(.,.)$, which is the kernel learning program. Under these assumptions, the posterior distribution of $f^i(\cdot)$ is Gaussian and is available in closed form. In GPR, which is the model learning program, the crucial aspect is the selection of the prior functions for $f^i(\cdot)$, defined by $m_f^i(\cdot)$, usually considered 0, and $k_f^i(.,.)$. In the following we will refer to $f(\cdot)$ and $k(.,.)$ as one of the $f(\cdot)$ components and the relative kernel function, respectively. In the literature, when GPR is applied to modeling of physical systems, the kernel function or kernel learning program is often defined in one of the following cases.

Physically inspired kernels: When the physical model of the system is derived by first principles, the model information might be used to identify a feature space over which the evolution of the system is linear. More precisely, assume that the model can be written in the form $y_k = \phi(\bar{x}_k)^T w$, where $\phi(\bar{x}_k): R^m \to R^q$ is a known nonlinear function obtained by first principles that maps the GPR inputs vector $\bar{x}_k$ onto the physically inspired features space, and w is the vector of unknown parameters, modeled as a zero mean Gaussian random variable, i.e. w: N(0, $\Sigma_{PI}$), with $\Sigma_{PI} \in R^{q \times q}$ often chosen to be diagonal. The expression of the physically inspired kernel (PI) is $$k(\bar{x}_k, \bar{x}_j) = \phi(\bar{x}_k)^T \Sigma_{PI} \phi(\bar{x}_j), \quad (2)$$

namely a linear kernel in the features $\phi(\cdot)$. The efficiency of PI kernels in terms of estimation performances is closely related the adherence between the model and the behaviors of the real system. When the model is accurate these kernels exhibits good performances in terms of accuracy and generalization.

For later convenience, we define also the homogeneous polynomial kernel in $\phi(\cdot)$, which is a more general case of (2), $$k_{poly}^P(\bar{x}_k, \bar{x}_j) = (\phi(\bar{x}_k)^T \Sigma_{PI} \phi(\bar{x}_j))^P. \quad (3)$$

Notice that the linear kernel is obtained when P=1. The hyperparameters to be estimated remain the diagonal elements of the matrix $\Sigma_{PI}$.

Nonparametric kernel: When there is no known structure of the process to be modeled, the kernel has to be chosen by the user accordingly to their understanding of the process to be modeled. A common option is the Radial Basis Function kernel (RBF):

$$k_{RBF}(\bar{x}_k, \bar{x}_j) = A e^{-\frac{(\bar{x}_k - \bar{x}_j)^T \Sigma_{RBF}^{-1} (\bar{x}_k - \bar{x}_j)}{2}}, \quad (4)$$

where $\lambda$ is a positive constant called the scaling factor, and $\Sigma_{RBF}$ is a positive definite matrix that defines the norm over which the distance between $\bar{x}_k$ and $\bar{x}_j$ is computed. The scaling factor and the elements of $\Sigma_{RBF}$ are unknown parameters called hyperparameters; for this reason, it is called a nonparametric (NP) kernel. Several options to parametrize $\Sigma_{RBF}$ have been proposed e.g., a diagonal matrix or a full matrix defined by the Cholesky decomposition, namely $\Sigma_{RBF} = LL^T$. In this case, the hyperparameters of $\Sigma_{RBF}$ are the elements of the lower triangular matrix L, where the elements along the diagonal are constrained to be positive. Notice that with this choice, all the positive definite matrices are parameterized.

Semiparametric kernel: This approach combines the physically inspired and the non-parametric kernels. Here the kernel function is defined as the sum of the covariance's:

$$k(\bar{x}_k, \bar{x}_j) = \phi(\bar{x}_k)^T \Sigma_{PI} \phi(\bar{x}_j) + k_{NP}(\bar{x}_k, \bar{x}_j). \quad (5)$$

where $k_{NP}(.,.)$ can be for example the RBF kernel (4).

The semi-parametric (SP) kernel takes advantage of the global property of the parametric kernel $k_{PI}$ as well as of the flexibility of the nonparametric kernel $k_{NP}$. Using SP kernels has been shown to have a model learning program which generalize well also to area of the state space not well explored by the data, typical behavior of model learning programs obtained with nonparametric kernels, and at the same time to have higher accuracy performance than the model learning programs obtained with parametric kernels which suffer of unmodeled dynamics.

Trajectory Optimization using iLQG: Some embodiments of the present disclosure are based on recognition that the iLQG algorithm can be used for trajectory optimization. Given a discrete time dynamics such as (1) and a cost function, the algorithm computes local linear models and quadratic cost functions for the system along a trajectory. These linear models are then used to compute optimal control inputs and local gain matrices by iteratively solving the associated LQG problem. The cost function for controller design is a function of e, the state deviation from the target state x, and of the input saturation. As concerns the state cost, typically the "smooth-abs" function is used, given by $\ell_x^*(e) = \sqrt{(\|e\|_2^2 + \beta^2)} - \beta$, where $\|e\|_2^2$ is the square of the Euclidean norm of e and $\beta$ is a parameter that controls the smoothness of the function around zero. In order to account for eventual constraints on input saturation, the cosine-hyperbolic function can be used, $\ell_u^i(u) = \gamma^2 \cosh((u^i/\gamma) - 1)$, that ensures that the costs exponentially grow to infinity outside of the desired control volume, the parameter $\gamma$ governs this volume. This cost function is optimized by linearizing the GP models and performing backward and forward search using the iLQG algorithm.

Derivative-Free Framework for Reinforcement Learning Algorithms

In this section, a novel learning framework to model the evolution of a physical system is proposed. Several issues need to be addressed in the standard modeling approach described above. We list here the main problems to be solved by some embodiments of the present disclosure.

First, the numerical differentiation: The Rigid Body Dynamics of any physical system computed from physical first principles are functions of joint positions, velocities and accelerations. However, a common issue is that often joint velocities and accelerations cannot be measured and computing them by means of numerical differentiation starting from the (possibly noisy) measurements of the joint positions might severely hamper the final solution. This is a very well-known and often discussed problem and it is usually partially addressed by ad-hoc filter design. However, this requires significant user knowledge and experience in tuning the filters' parameters, and is still prone to introducing various errors and delays.

Second, the conditional independence assumption: The assumption of conditional independence among the $f^i(\bar{x}_k)$ with $i = 1 \ldots d$ given $\bar{x}_k$ in (1) might be a very imprecise approximation of the real system's behavior, in particular when the outputs considered are position, velocity or acceleration of the same variable, which are correlated by nature. This fact is both an issue for estimation performance and an issue because one separate GP for each output needs to be estimated for modeling variables intrinsically correlated, leading to redundant modeling design and testing work, and a waste of computational resources and time. This last aspect might be particularly relevant when considering systems with a considerable number of degrees of freedom.

Third, delays and nonlinearities in the dynamics: Finally, physical systems often are affected by intrinsic delays and nonlinear effects that have an impact on the system over several time instants, contradicting the first-order Markov assumption; an instance of such behavior is discussed later.

Derivative-Free State definition

To overcome the aforementioned limitations, we define the system state in a derivative-free fashion, considering as state elements the history of the position measurements:

$$x_k = [q_k, \ldots, q_{k-k_p}] \in \mathbb{R}^{n(k_p+1)}. \quad (6)$$

where $k_p \in \mathbb{R}$ is a positive integer.

The definitions of the states are described as follows. In some cases, the object state data may represent a set of sequential measurement data of positions of the object in a predetermined period of time, and the robot state data may represent a set of sequential measurement data of positions of the robot in a predetermined period of time.

The definition above can be understood that when velocities and accelerations measures are not available, if $k_p$ is chosen sufficiently large, then the history of the positions contains all the system information available at time k, leaving to the model learning algorithm the possibility of estimate the state transition function. Indeed, velocities and accelerations computed through causal numerical differentiation are the outputs of digital filters with finite impulse response (or with finite past instants knowledge for nonlinear filters), which represent a statistic of the past raw position data. These statistics cannot be exact in general, and might be severely corrupted by, for example, the delay introduced when a low-pass filter is used to reject the noise, or by the compound error propagation if several filters are applied, leading to a loss of information for the learning algorithm. Instead, this loss of information is kept in the proposed derivative-free framework which is some embodiment of the present disclosure. The state transition function becomes deterministic and known (i.e., the identity function) for all the $[q_{k-1}, \ldots, q_{k-k_q}]$ components of the state. Consequently, the problem of learning the evolution of the system is restricted to learning only the functions $q_{k+1} = f(x_k, u_k)$ reducing the number of models to learn and avoiding erroneous conditional independence assumptions. Finally, the MDP has some state information rich enough to be robust to intrinsic delays and to obey the first-order Markov property.

State Transition Learning with PIDF Kernel

The proposed state definition entails the need of a modeling technique for the MDP's state transition function. Derivative-free GPRs were already introduced only for nonparametric derivative-free GPR. However, as pointed in the above, the generalization performance of data-driven models might not be sufficient to guarantee robust learning performance, and exploiting eventual prior information coining from the physical model is crucial. On the other hand, physical models depend on positions, velocities and accelerations, and their use in a derivative-free framework is not possible in the standard formulation, the embodiments of the present disclosure solve this issue. In the following the procedure to obtain the so called Physically Inspired Derivative-Free (PIDF) kernel is proposed.

Define $q_{k-}^i = [q_k^i, \ldots, q_{k-k_p}^i]$ and assume that a physical model of the type $y_k = \phi(q_k, \dot{q}_k, \ddot{q}_k u_k)w$, is known. Then, we propose a set of guidelines based on $\phi(q_k, \dot{q}_k, \ddot{q}_k, u_k)$ to derive a PIDF kernel, which is an important component of the DFSPGP model learning program.

PIDF Kernel Guidelines: Each and every position, velocity or acceleration term in $\phi(\cdot)$ is replaced by a distinct polynomial kernel $k_{poly}^P(.,.)$ of degree p, where p is the degree of the original term; e.g., $\ddot{q}^{i^2} \to k_{poly}^2(.,.)$.

The input of each of the kernels $k_{poly}^P(.,.)$ in 1) is a function of $q_{k-}^i$, the history of the position $q^i$ corresponding to the independent variable of the substituted term; e.g., $\ddot{q}^{i^2} \to k_{poly}^2(q_{k-}^1,.)$.

If a state variable appears into $\varphi(\cdot)$ transformed by a function $g(\cdot)$, the input to $k_{poly}^P(.,.)$ becomes the input defined at point 2) transformed by the same function $g(\cdot)$, e.g., $\sin(q^i) \to k_{poly}^1(\sin(q_{k-}^i), \sin(q_{j-}^i.))$.

Applying this guidelines will generate a kernel function $k_{PIDF}(.,.)$ which incorporate the information given by the physics without knowing velocity and acceleration.

The extension to semi-parametric derivative-free (SPDF) kernels become trivial when combing, as described in section "Semiparametric kernel", the proposed $k_{PIDF}(x_k,.)$ with a NP kernel with derivative-free state, $k_{NPDF}(x_k,.)$:

$$k_{SPDF}(x_k,x_j) = k_{PIDF}(x_k,x_j) + k_{NPDF}(x_k,x_j). \quad (7)$$

which is the DF-SPGP kernel learning program. These guidelines formalize the solution to the non-trivial issue of modeling real systems using the physical models but without measuring velocity and acceleration. In other words, the DF-SPGP Model learning program, which is defined based on the DF-SPGP kernel learning program (the DF-SPGP kernel learning program may define the DF-SPGP Model learning program), can predict behaviors of the robot and/or the object manipulated by the robot.

Features

Contemplated is that one or a combination of aspects can be included in independent claim 1 to create one or more different embodiments. For example, some of the one or a combination of aspects can include the following:

An aspect can include that wherein the HP model for the HW is previously configured to have learned different states of HW performance that correspond as a set of boundaries in the human data. Wherein the DMP model is previously configured to have learned different the operation of the manufacturing process that is used to assist in issuing classifications of anomalies or no anomaly detection. Wherein the HRI model is previously configured to have learned mappings between the different states of the HW and optimal robot actions.

Another aspect can be an event transition table is used to specify discovered positional relationships between pairs of events from training data of the behavior, if the sequence of events from the test signals is inconsistent with the behavior, then the alarm is to be signaled. It is possible an aspect can be that an event transition table can be constructed from training signals during a training phase, such that the training signals are acquired from a monitoring system of the DMP, during operation of the DMP, such that the hardware processor includes determining minimal and maximal durations for the at least one task and for multiple tasks. Still, an aspect may be determining, if a sequence of events is feasible given the event transition table and a predicted completion time of the human robot team.

Another aspect could be that the input interface acquires training data from the DMP sensors during a training operation of the DMP while in an off-line training period, before acquiring the test data, and upon receiving the training data. The hardware processor can be configured to extract events from the training signals as a sequence to construct the event transition table of ordering relations of allowed positional relationships between pairs of observed events during the training operation of the DMP, and store the sequence of events in the memory. Further, an aspect can be that the DMP data includes other data such as DMP component training data, DMP assembly line training data, DMP operational training data, DMP management training data, and wherein the DMP signals include other data such as DMP component data, DMP assembly line data, DMP operational data, DMP management data, and wherein the HW signals from HW sensors include a time series of measurements of tasks completed by the HW.

Another aspect may be that some of the classifications of anomaly detections can include robot actions associated with the state of the HW, that include, different levels of speed, X-axis, Y-axis and Z-axis movements of the robot, voice announcements, making calls, maintaining robot positions for one or more periods of time, adjusting environmental conditions via commands sent to a controller, and wherein some of the types of classification of anomalies also include detection of future anomalies, maintenance related anomalies, safety related anomalies, lost production anomalies, potential failure of components anomalies, quality anomalies and assembly line anomalies. Further still, another aspect can be the HP model is constructed from HW training signals of completed training tasks during a training phase prior to receiving the HW signals, such that the training signals includes data for each completed training task of the completed training tasks that includes a training task name, multiple training states of the HW for the completed training task, and a next sequenced training task, such that the HW training signals and the HW signals are acquired from sensors associated the HW during a training operation or an operation of the DMP with the human-robot teams.

Another aspect can be the HP model is constructed by a Human Task Execution (HTE) model and a model of the state of the HW, wherein the HTE model is constructed using at least one predictive model trained using HW training signals obtained during a training phase completing a sequence of training tasks, and wherein the model of the state of the HW is constructed using at least one classification model trained using the HW training signals, such that each completed training task is associated with multiple states of the HW, and is stored in the memory. Wherein the at least one predictive model is configured to learn expected completion times for each completed task, identify or capture patterns of movements of the HW observed in sensor data obtained from sensors, and wherein at least one statistical model learning approach, includes one or more predictive model, one or more classification model, or both, that is capable of producing estimates of a completion time of an on-going task given sensor measurements of the HW while the HW is interactively working with the robot in completing the at least one task. Wherein the at least one classification model is configured to learn a state of the HW from the HW signals by first determining a task label of a task completed and a next sequenced task, then uses a gaze detection algorithm to determine the state of the HW, such as an amount of a level of focus and an amount of a level of energy of the HW at a time of completing the task.

An aspect is that if no anomaly detection is produced, then the state of the HW is compared to a predetermined level of HW performance thresholds of the HW model, and if greater than, a HW peak performance threshold, indicating a peak performance by the HW to complete the task, then, the HP model is updated to model peak performance by the HW, and wherein the level of the HW performance is determined by extracting data from the received HW signals, such as an adherence of the HW measurements to the learned statistical models, a degradation of model performance, or a specific learning model that is used to predict the obtained state of the HW. Or, an aspect may be the HW data includes data for each completed training task, such as one or a combination of, patterns of movements by the HW, an energy level of the HW, a skill level associated with a set of HW skill levels, and historical levels of states of the HW corresponding to a performance matrix associated with each completed training task label.

Another aspect is that an event transition table or a log-based ordering relationship table can be built by each entry in the event transition table and is initialized with a ⊁ symbol label, the memory is scanned sequentially, and for any pair of events where one event immediately follows another event, a corresponding entry of the event transition table is changed to a > symbol label, upon completion of the scanning, any two events are either in the > symbol label or the ⊁ symbol label relations, then derive relations →, ←, ∥, and # computed on the basis of the relations of the > symbol label and the ⊁ symbol label from the memory, using a set of rules: A→B, if A>B and B⊁A; A←B, if A⊁B and B>A; A∥B, if A>B and B>A; and A #B, if A⊁ B and B⊁A, wherein the event transition table and probability distributions over task durations measured in intervals of time, specifies the discovered positional relationships between pairs of events from training data of the behavior of the operation of the DMP, wherein A is an event and B is an event, and A>B is where the event A immediately follows the event B.

An aspect can be that wherein some of the previously learned boundaries of different types of anomalies and no anomalies learned from the Human data by the HP model include a HW that is no longer working, a distracted HW, an HW experiencing a level of energy indicating the HW is tired or underperforming according to the previously learned boundaries, or a HW experiencing a level of energy indicating the HW is energetic or performing at a high energy level according to the previously learned boundaries, or a HW experiencing a level of energy indicating the HW is not tired or energetic such as an average energetic level, or performing at a level of energy associated with an average HW performance according to the previously learned boundaries.

What is claimed is:

1. A process control system for detecting an anomaly in a discrete manufacturing process (DMP) with human-robot teams executing at least one task within the process, comprising:
    a memory configured to store data including robot data, manufacturing process (MP) data, human data, and executable models;
    an input interface configured to receive test signals including DMP signals from DMP sensors that includes robot operational signals, and human worker (HW) signals from human worker (HW) sensors;
    a hardware processor in communication with the memory and the input interface, the hardware processor configured to:
        extract a predicted sequence of events from the DMP signals, and determine whether the predicted sequence of events in the DMP signals is inconsistent with a behavior of operation of the DMP described in a DMP model, and if the predicted sequence of events from the DMP signals is inconsistent with the behavior, then an alarm is to be signaled;
        extract from the HW signals, a task completion time, measurements relating to a state of a human worker (HW) and a next predicted sequenced task, and input into a Human performance (HP) model, the HP model determines the state of the HW based on previously learned boundaries of the state of the HW, such that the state of the HW is inputted into a Human-Robot Interaction (HRI) model, and outputs from a human worker (HW) model, the HRI model, or both, are inputted into the DMP model to determine a classification of anomaly or no anomaly,
        wherein the HP model for the HW is previously configured to have learned different states of human worker (HW) performance that correspond as a set of boundaries in the human data, and wherein the DMP model is previously configured to have learned different the operation of the manufacturing process that is used to assist in issuing classifications of anomalies or no anomaly detection;
        update the HRI model with the robot operation signals, the HW signals and the classified anomaly;
        determine a control action of a robot interacting with the HW or a type of an anomaly alarm using the updated HRI model and the classified anomaly; and
    an output interface to output the control action of the robot to change a robot action, or output the type of the anomaly alarm to a management system of the DMP, based on the updated HRI model and the classified anomaly.

2. The process control system of claim 1, wherein the HRI model is previously configured to have learned mappings between the different states of the HW and optimal robot actions.

3. The process control system of claim 1, wherein an event transition table is used to specify discovered positional relationships between pairs of events from training data of the behavior, and if the predicted sequence of events from the test signals is inconsistent with the behavior, then the alarm is to be signaled.

4. The process control system of claim 3, wherein the event transition table is built by each entry in the event transition table and is initialized with a ⊁ symbol label, the memory is scanned sequentially, and for any pair of events where one event immediately follows another event, a corresponding entry of the event transition table is changed to a > symbol label, upon completion of the scanning, any two events are either in the > symbol label or the ⊁ symbol label relations, then derive relations →, ←, ∥, and # computed on the basis of the relations of the > symbol label and the ⊁ symbol label from the memory, using a set of rules: A→B, if A>B and B⊁A; A←B, if A⊁B; and B>A; A∥B, if A>B and B>A; and A #B, if A⊁B and B⊁A,
    wherein the event transition table and probability distributions over task durations measured in intervals of time, specifies the discovered positional relationships between pairs of events from training data of the behavior of the operation of the DMP, wherein A is an event and B is an event, and A>B is where the event A immediately follows the event B.

5. The process control system of claim 1, wherein an event transition table is constructed from training signals during a training phase, such that the training signals are acquired from a monitoring system of the DMP, during operation of the DMP, such that the hardware processor includes determining minimal and maximal durations for the at least one task and for multiple tasks.

6. The process control system of claim 5, wherein the hardware processor is further configured to:

determine if the predicted sequence of events is feasible given the event transition table and a predicted completion time of a human-robot team of the human robot teams.

7. The process control system of claim 1, wherein the input interface acquires training data from the DMP sensors during a training operation of the DMP while in an off-line training period, before receiving the test signals, and the hardware processor is configured to:
   extract events from the training signals as a sequence to construct an event transition table of ordering relations of allowed positional relationships between pairs of observed events during the training operation of the DMP, and
   store the predicted sequence of events in the memory.

8. The process control system of claim 1, wherein the DMP signals include one or more of DMP component training data, DMP assembly line training data, DMP operational training data, DMP management training data, and wherein the DMP signals include other data comprising one or more of DMP component data, DMP assembly line data, DMP operational data, or DMP management data, and wherein the HW signals from HW sensors include a time series of measurements of tasks completed by the HW.

9. The process control system of claim 1,
   wherein-some of the classifications of anomaly detections include robot actions associated with the state of the HW, that include, different levels of speed, X-axis, Y-axis and Z-axis movements of the robot, voice announcements, making calls, maintaining robot positions for one or more periods of time, adjusting environmental conditions via commands sent to a controller, and
   wherein some of the types of classification of anomalies also include detection of future anomalies, maintenance related anomalies, safety related anomalies, lost production anomalies, potential failure of components anomalies, quality anomalies and assembly line anomalies.

10. The process control system of claim 1, wherein the HP model is constructed from Human worker (HW) training signals of completed training tasks during a training phase prior to receiving the HW signals, such that the HW training signals includes data for each completed training task of the completed training tasks that includes a training task name, multiple training states of the HW for the completed training task, and a next sequenced training task, such that the HW training signals and the HW signals are acquired from sensors associated with the HW during a training operation or an operation of the DMP with the human-robot teams.

11. The process control system of claim 1, wherein the HP model is constructed by a Human Task Execution (HTE) model and a model of the state of the HW, wherein the HTE model is constructed using at least one predictive model trained using Human worker (HW) training signals obtained during a training phase completing a sequence of training tasks, and wherein the model of the state of the HW is constructed using at least one classification model trained using the HW training signals, such that each completed training task is associated with multiple states of the HW, and is stored in the memory.

12. The process control system of claim 11, wherein the at least one predictive model is configured to learn expected completion times for each completed task, identify or capture patterns of movements of the HW observed in sensor data obtained from sensors, and wherein at least one statistical model learning approach, includes one or more predictive model, one or more classification model, or both, that is capable of producing estimates of a completion time of an on-going task given sensor measurements of the HW while the HW is interactively working with the robot in completing the at least one task.

13. The process control system of claim 11, wherein the at least one classification model is configured to learn a state of the HW from the HW signals by first determining a task label of a task completed and a next sequenced task, then uses a gaze detection algorithm to determine the state of the HW, such as an amount of a level of focus and an amount of a level of energy of the HW at a time of completing the task.

14. The process control system of claim 1, wherein, if the no anomaly is determined, then the state of the HW is compared to a predetermined level of Human worker (HW) performance thresholds of the HW model, and if greater than, a HW peak performance threshold, indicating a peak performance by the HW to complete the task, then, the HP model is updated to model peak performance by the HW, and wherein the level of the HW performance is determined by extracting data from the received HW signals, such as an adherence of the HW measurements to the learned statistical models, a degradation of model performance, or a specific learning model that is used to predict the obtained state of the HW.

15. The process control system of claim 1, wherein the HW signals includes data for each completed training task including one or a combination of, patterns of movements by the HW, an energy level of the HW, a skill level associated with a set of HW skill levels, and historical levels of states of the HW corresponding to a performance matrix associated with each completed training task label.

16. The process control system of claim 1, wherein some of the previously learned boundaries of different types of anomalies and no anomalies learned from the Human data by the HP model include a HW that is no longer working, a distracted HW, a HW experiencing a level of energy indicating the HW is tired or underperforming according to the previously learned boundaries, or a HW experiencing a level of energy indicating the HW is energetic or performing at a high energy level according to the previously learned boundaries, or a HW experiencing a level of energy indicating the HW is not tired or energetic such as an average energetic level, or performing at a level of energy associated with an average HW performance according to the previously learned boundaries.

17. A method for a process control system for detecting an anomaly in a discrete manufacturing (DMP) with human-robot teams executing at least one task within the process, the method comprising steps of:
   receiving test signals that includes DMP signals from DMP sensors that includes robot operational signals, and human worker (HW) signals from human worker (HW) sensors corresponding to a human worker (HW), the HW signals including a time series of measurements of tasks completed by the HW;
   extracting a predicted sequence of events from the DMP signals and determine whether the predicted sequence of events in the DMP signals is inconsistent with a behavior of operation of the DMP described in a DMP model, and if the predicted sequence of events from the DMP signals is inconsistent with the behavior, then an alarm is to be signaled;
   extracting from the HW signals, a task completion time, a task name, measurements relating to a state of the HW and a next predicted sequenced task, and input into a Human Performance (HP) model, to obtain a state of the HW based on previously learned boundaries of the state of the HW, the state of the HW is then inputted into a Human-Robot Interaction (HRI) model, such that outputs of a Human Worker (HW) model, the HRI model, or both, are inputted into the DMP model to determine a classification of an anomaly or no anomaly, wherein the HP model for the HW is previously configured to have learned different states of human worker (HW) performance that correspond as a set of boundaries in the human data, and wherein the DMP model is previously configured to have learned different the operation of the manufacturing process that is used to assist in issuing classifications of anomalies or no anomaly detection;

updating the HRI model with the robot operation signals, the HW signals and the classified anomaly;

determining a control action of a robot interacting with the HW or a type of an anomaly alarm using the updated HRI model and the classified anomaly; and outputting the control action of the robot to change a robot action, or output the type of the anomaly alarm to a management system of the DMP, based on the updated HRI model and the classified anomaly, wherein the steps are implemented by a hardware processor communicatively coupled with a memory.

18. The method of claim 17, wherein an event transition table specifies discovered positional relationships between pairs of events from training data of the behavior, if the predicted sequence of events from the test signals is inconsistent with the behavior, then the alarm is to be signaled, and wherein previous DMP data, previous Human data and previous Human-Robot data are obtained prior to the receiving of the test signals and are stored in the memory.

19. The method of claim 17, wherein the type of anomaly alarm includes one or a combination of, a suspected assembly line mechanical failure, a suspected material supply problem to the assembly line, an under production problem due to the HW, a suspected robot related problem, an operator related task or a suspected electronic failure.

20. A non-transitory computer readable storage medium embodied thereon a program executable by a computer for performing a method for a process control system for detecting an anomaly in a discrete manufacturing process (DMP) with human-robot teams executing at least one task within the process, the method comprising steps of:

receiving test signals that includes DMP signals from DMP sensors that includes robot operational signals, and human worker (HW) signals from human worker (HW) sensors corresponding to a human worker (HW);

extracting a predicted sequence of events from the DMP signals and determine whether the predicted sequence of events in the DMP signals is inconsistent with a behavior of operation of the DMP described in a DMP model, and if the predicted sequence of events from the DMP signals is inconsistent with the behavior, then an alarm is to be signaled;

extracting from the HW signals, a task completion time, measurements relating to a state of the HW and a next predicted sequenced task, and input into a Human Performance (HP) model, to obtain a state of the HW based on previously learned boundaries of the state of the HW, the state of the HW is then inputted into a Human-Robot Interaction (HRI) model, such that outputs of a Human Worker (HW) model, the HRI model, or both, are inputted into the DMP model to determine a classification of anomaly or no anomaly, wherein the HP model is constructed from Human worker (HW) training signals of completed training tasks during a training phase prior to receiving the HW signals, such that the HW training signals includes data for each completed training task of the completed training tasks that includes a training task name, multiple training states of the HW for the completed training task, and a next sequenced training task, such that the HW training signals and the HW signals are acquired from sensors associated with the HW during a training operation or an operation of the DMP with the human-robot teams;

updating the HRI model with the robot operation signals, the HW signals and the classified anomaly, then determine a control action of a robot interacting with the HW or a type of an anomaly alarm using the updated HRI model and the classified anomaly; and outputting the control action of the robot to change a robot action, or output the type of the anomaly alarm to a management system of the DMP, based on the updated HRI model and the classified anomaly, wherein the steps are implemented by a hardware processor connected to a memory.

21. A process control system for detecting an anomaly in a discrete manufacturing process (DMP) with human-robot teams executing at least one task within the process, comprising:

a memory configured to store data including robot data, manufacturing process (MP) data, human data, and executable models;

an input interface configured to receive test signals including DMP signals from DMP sensors that includes robot operational signals, and human worker (HW) signals from human worker (HW) sensors corresponding to a human worker (HW);

a hardware processor in communication with the memory and the input interface, the hardware processor configured to:

extract a predicted sequence of events from the DMP signals, and determine whether the predicted sequence of events in the DMP signals is inconsistent with a behavior of operation of the DMP described in a DMP model, and if the predicted sequence of events from the DMP signals is inconsistent with the behavior, then an alarm is to be signaled;

extract from the HW signals, a task completion time, measurements relating to a state of the HW and a next predicted sequenced task, and input into a Human performance (HP) model, wherein the HP model is constructed by a Human Task Execution (HTE) model and a model of the state of the HW, wherein the HTE model is constructed using at least one predictive model trained using Human worker (HW) training signals obtained during a training phase completing a sequence of training tasks, and wherein the model of the state of the HW is constructed using at least one classification model trained using the HW training signals, such that each completed training task is associated with multiple states of the HW, and is stored in the memory, and wherein the HP model determines the state of the HW based on previously learned boundaries of the state of the HW, such that the state of the HW is inputted into a Human-Robot Interaction (HRI) model, and outputs from a human worker (HW) model, the HRI model, or both, are inputted into the DMP model to determine a classification of anomaly or no anomaly;
update the HRI model with the robot operation signals, the HW signals and the classified anomaly;
determine a control action of a robot interacting with the HW or a type of an anomaly alarm using the updated HRI model and the classified anomaly; and
an output interface to output the control action of the robot to change a robot action, or output the type of the anomaly alarm to a management system of the DMP, based on the updated HRI model and the classified anomaly.

\* \* \* \* \*